United States Patent [19]
Martinez

[11] Patent Number: 5,812,184
[45] Date of Patent: Sep. 22, 1998

[54] TRANSMISSION OF FRAME-TO-FRAME REVERSED POLARITY SIGNALS IN A TWO-WAY CABLE TV CONVERSION SYSTEM

[75] Inventor: Louis Martinez, Perris, Calif.

[73] Assignee: Radio Telecom & Technology, Inc., Riverside, Calif.

[21] Appl. No.: 526,841

[22] Filed: Sep. 11, 1995

Related U.S. Application Data

[60] Division of Ser. No. 207,386, Mar. 7, 1994, which is a continuation-in-part of Ser. No. 941,187, Sep. 4, 1992, Pat. No. 5,321,514, which is a division of Ser. No. 202,206, Jun. 3, 1988, Pat. No. 5,177,604, which is a division of Ser. No. 863,101, Apr. 3, 1992, Pat. No. 5,160,061.

[51] Int. Cl.$^6$ ........................................ H04N 7/14
[52] U.S. Cl. .............................. 348/12; 455/3.3; 455/5.1
[58] Field of Search .................... 348/6, 12, 13, 348/7, 486; 370/24; 455/3.1, 3.2, 3.3, 4.2, 5.1

[56] References Cited

U.S. PATENT DOCUMENTS

| | | | |
|---|---|---|---|
| 3,842,196 | 10/1974 | Loughlin | 348/486 |
| 3,924,060 | 12/1975 | Bedford | 348/486 |
| 3,943,447 | 3/1976 | Shomo, III | 455/3.1 |
| 4,959,862 | 9/1990 | Davidov et al. | 348/6 |
| 5,010,399 | 4/1991 | Goodman et al. | |
| 5,063,446 | 11/1991 | Gibson | 348/486 |
| 5,220,420 | 6/1993 | Hoarty | 348/13 |
| 5,243,423 | 9/1993 | Dejean et al. | |
| 5,408,259 | 4/1995 | Warwick | 348/6 |
| 5,499,047 | 3/1996 | Terry et al. | 348/12 |
| 5,528,582 | 6/1996 | Bodeep et al. | 370/24 |

Primary Examiner—Victor R. Kostak
Attorney, Agent, or Firm—Blakely, Sokoloff, Taylor & Zafman LLP

[57] ABSTRACT

A bidirectional cable television system provides for transmission of signals from cable subscribers downlink in the same direction as the ensemble of television channels which the cable television system is already constructed to deliver. The subscriber signals may be transmitted over the cable in the blanking intervals of a cable television channel, using the T-NET technique described in U.S. Pat. No. 4,750,036. Alternatively, the signals may be carried over a dedicated channel, or transmitted cochannel along a cable television channel carrying ordinary programming by adding the subscriber information to alternating video frames in alternating polarity to achieve visual cancellation. The subscriber signals are collected after the last distribution line amplifier in the cable downlink. The collected signals are transmitted to a central receiver via wireless or other customary means such as a modem. The collected signals may alternatively be transmitted over the air to the central receiver in the blanking intervals of a broadcast television channel using the T-NET technique.

57 Claims, 14 Drawing Sheets

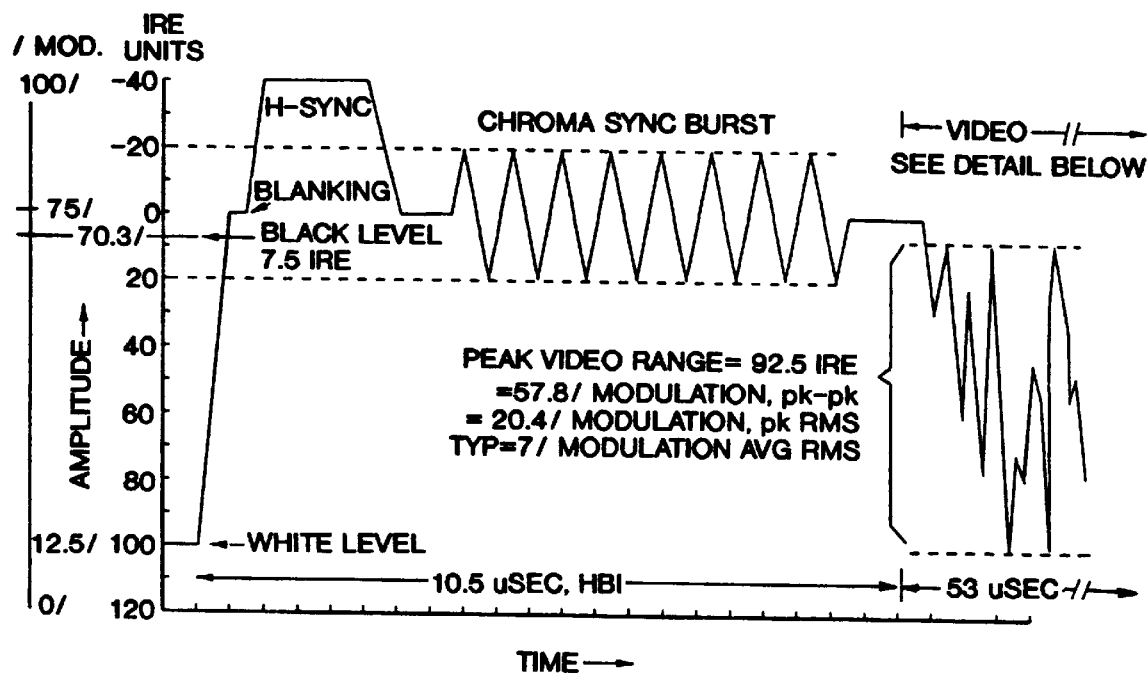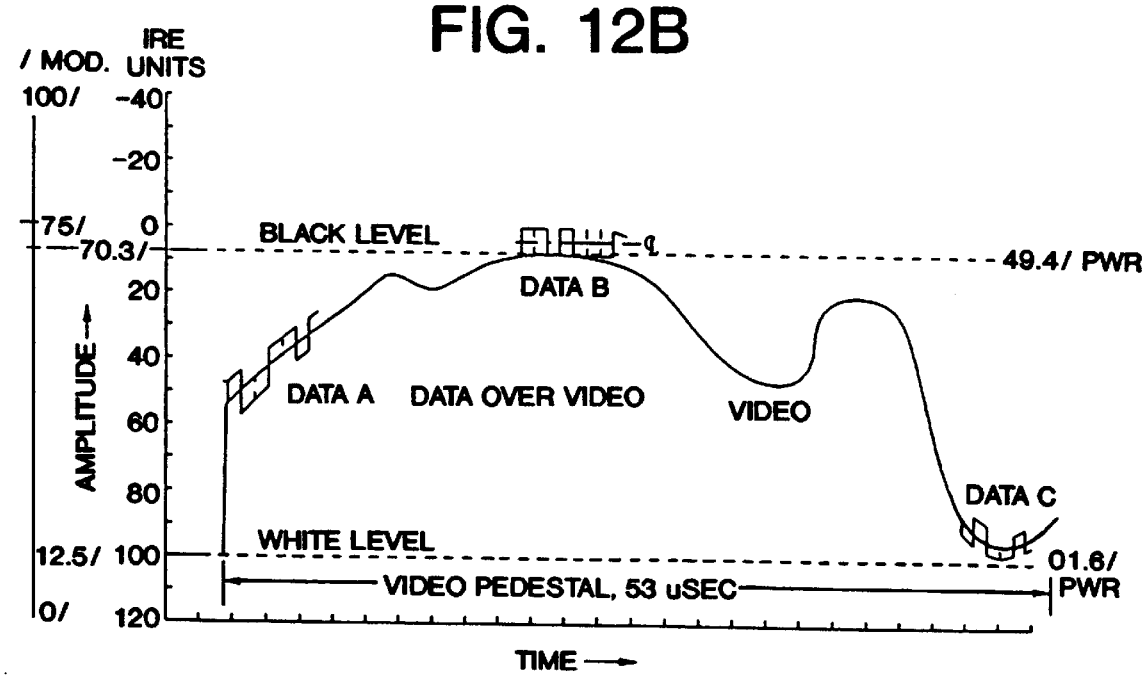

FIG. 16

| Waveform Segment | PW, uSec | Freq, Hz | BW, KHz | Duty Cycle | % Mod. | Relative Pwr % Pk | Relative Pwr % Avg. | Rel. Pwr, dB Pk | Rel. Pwr, dB Avg | Pk Pwr Re: TV Xmtr @100Kw | Pk Pwr Re: TV Xmtr @36.3KW | dB Pwr | Figures Below are Ap @ Gr "B" | S/N @Gr B |
|---|---|---|---|---|---|---|---|---|---|---|---|---|---|---|
| A. V-Sync Pedestal | 1334.66 | 60 | 0.7493 | 0.080 | 75 | 56.3 | 4.50 | -2.5 | -13.5 | 56250 | 20419 | -64.6 dBm | | 35.4 |
| B. Equilizing Pulses in VBI | 2.55 | 31468 | 392.2 | 0.002 | 100 | 100.0 | 0.18 | 0.0 | -27.4 | 100000 | 36300 | -62.1 | | 37.9 |
| C. V-Sync Pulses | 29.2 | 31468 | 34.2 | 0.010 | 100 | 100.0 | 1.00 | 0.0 | -20.0 | 100000 | 36300 | -62.1 | | 37.9 |
| D. H-Sync Pedestal | 9.53 | 15734 | 104.9 | 0.152 | 75 | 56.3 | 8.55 | -2.5 | -10.7 | 56250 | 20419 | -64.6 | | 35.4 |
| E. H-Sync Pulses | 4.77 | 15734 | 209.6 | 0.067 | 100 | 100.0 | 6.70 | 0.0 | -11.7 | 100000 | 36300 | -62.1 | =Gr B | 37.9 |
| F. Video White Level (Pedestal) | 53 | 15734 | 18.9 | 0.768 | 12.5 | 1.6 | 1.20 | -18.1 | -19.2 | 1563 | 567 | -80.2 | | 19.8 |
| G. Video Mid-level | 53 | 15734 | 18.9 | 0.768 | 41.4 | 17.1 | 13.16 | -7.7 | -8.8 | 17140 | 6222 | -69.8 | | 30.2 |
| H. Video Black Level | 53 | 15734 | 18.9 | 0.768 | 70.31 | 49.4 | 37.97 | -3.1 | -4.2 | 49435 | 17945 | -65.2 | | 34.8 |
| I. T-NET Signal (3.75% Mod.*) @ Wht Level | | | | 0.768 | 3.75 | 0.9 | 0.72 | -20.3 | -21.4 | 938 | 340 | -82.4 dBm | | 17.6 |
| J. T-NET Signal (3.75% Mod.) @ Mid Level | | | | 0.768 | 3.75 | 3.1 | 2.38 | -15.1 | -16.2 | 3105 | 1127 | -77.2 | | 22.8 |
| K. T-NET Signal (3.75% Mod.) @ Blk Level | | | | 0.768 | 3.75 | 5.3 | 4.05 | -12.8 | -13.9 | 5273 | 1914 | -74.9 | | 25.1 |
| | | | | Total | | 100.0 | | 0.0 | | 100000 | 36300 | -62.1 dBm | | 37.9 |

*Note: 3.75% Mod = +/- 6 IRE

TRANSMISSION OF FRAME-TO-FRAME REVERSED POLARITY SIGNALS IN A TWO-WAY CABLE TV CONVERSION SYSTEM

CROSS REFERENCE TO RELATED APPLICATIONS

This is a divisional of application Ser. No. 08/207,386, filed Mar. 7, 1994, which is a continuation-in-part of application Ser. No. 07/941,187, filed Sep. 4, 1992 now U.S. Pat. No. 5,234,514, which is a divisional of application Ser. No. 07/202,206, filed Jun. 3, 1988, now U.S. Pat. No. 5,177,604, which is a divisional of application Ser. No. 07/863,101, now U.S. Pat. No. 5,160,061.

BACKGROUND OF THE INVENTION

This invention relates to improvements to the Interactive Television and Data Transmission System technology which this inventor calls T-NET and which is described in detail in his U.S. Pat. No. 4,750,036 dated Jun. 7, 1988 and divisional U.S. Pat. No. 5,177,604 dated Jan. 5, 1993. T-NET provides bi-directional communication (either wireless or cable) from one or several central locations to a plurality of fixed or mobile subscriber transceivers throughout a metropolitan area for applications in interactive TV, 2-way data or voice transmission, and the like. Today, such systems are often referred to as interactive TV or multimedia delivery systems. Furthermore, many CATV (Cable TV) operators are desirous of adding telephone and portable (cordless) phone message delivery capability to their CATV systems.

Generally speaking, the related T-NET technology disclosed in the inventor's previous patents concern TV signal-compatible modulation methods wherein data signals to be transmitted downlink to subscribers or uplink from them are placed either: (a) in blanking intervals of a co-channel or adjacent channel "host" television signal or alternatively, (b) the effective polarity of the information is reversed on sequential host TV signal frames and superimposed upon it so as to thereby become invisible to its viewers even though transmitting co-channel. The inventor calls method (b) "data-over-video".

Other related technology disclosed in aforesaid patents concern partitioning a metropolitan T-NET wireless service area into angular sectors and range intervals in a manner the inventor calls "virtual cellular" so as to gain the advantage of frequency re-use in non-adjacent cells to achieve substantially improved spectrum efficiency. This is made possible because T-NET measures and employs the RF signal propagation time to establish a radio "fence" (using "range gates") surrounding each transmitting device and thereby eliminates RF cross-talk between devices. This is in effect a combination of time-division and space division multiplex (TDM/SDM). A related method the inventor calls "cellular-cable" is taught in the instant application.

Yet another related T-NET method disclosed in prior applications is "synergistic modulation" wherein data signals to be communicated to remote locations are superimposed upon another existing but unrelated local (host) signal transmission in such a manner so as to synergistically employ the carrier and some of the spectral or temporal modulation of the unrelated signal. In this method the remote T-NET receivers are designed to detect both the data and unrelated host signal and subsequently processes the received data signal as if it were a subcarrier of the unrelated host carrier signal. This significantly improves the transmission reliability and detectability of the data in the presence of the usually more powerful unrelated signal, while minimizing or eliminating any interference the data might otherwise cause the unrelated signal, even when aforesaid data and host transmissions occur co-channel, or are on adjacent channels, or when the data and unrelated host signals propagate in opposite directions.

The application of the improved technology taught herein to interactive television and multimedia is of great interest today in the United States and elsewhere in the world. Improved use of the presently assigned radio frequency spectrum without displacing existing users, and more efficient and expanded use of existing telecommunication facilities are principal objects of this invention. Additional detailed background relating to the instant invention may be found in the patents cited above.

BRIEF SUMMARY OF THE INVENTION

2-Way CATV

The present invention provides further improvements to the T-NET technology. More specifically, one object of these improved T-NET methods is to provide technology which adds 2-way communication capability to existing cable television (CATV) systems, either coaxial cable or fiber optic, with only minor modification of the existing CATV distribution plant. While T-NET downlink TV signal and data delivery to CATV subscribers follows the customary path, the T-NET uplink delivery is novel because T-NET does not transmit subscriber responses in the industry proposed "uplink" direction, but rather in the opposite "downlink" direction propagating along the same path with the ensemble of television channels which the CATV system is already constructed to deliver. Viewer response signals are then extracted from the CATV cable section anywhere beyond the last distribution line amplifier and these responses are forwarded to a central processing facility via wireless or by other customary transmission means. T-NET eliminates the need for retrofitting existing CATV systems with reverse amplifiers.

The inventor refers to this T-NET application as "Cellular CATV", because each CATV distribution line is functionally a cell which is almost perfectly isolated (by line amplifiers) from other cells, consequently each viewer's RF response channel may be re-used in adjacent "cells" with no mutual interference. This cellular space isolation, when combined with viewer responses that are also restricted to specified time slots (in one T-NET embodiment), essentially eliminates viewer cross-talk between "Cells" and subscriber cumulative noise injection problems inherent in today's 2-way CATV system construction proposals which include "reverse amplifiers".

Another object of the instant T-NET improvements is to provide an economic and simple retrofit to existing CATV systems wherein the viewer's IR (infra-red) remote control signals are detected in a T-NET 2-way CATV retrofit module that is inserted between the CATV subscriber cable end connector and the existing TV set-top converter. This module relays the viewer's remote control signals through the CATV cable distribution lines by the method taught herein, and thence to a central location.

Alternatively, a special purpose RF remote control employing the T-NET circuits herein described may be used by subscribers to send signals to a passive or active repeater module (herein called an "RF uRelay") inserted between the cable connector and set-top converter as described above, but in this method the uRelay module's antenna picks up the RF remote control's RF signal and injects it into the cable of the CATV system, thence on toward the central receiving station in the manner described above. The RF uRelay module may be active or passive. In this alternative implementation, the inventor's preferred design employs a dedicated downlink CATV cable channel to carry subscribers responses and the preferred modulation is CDMA (code division multiple access) so that synchronization of subscribers signals on the CATV response channel is unnecessary. This embodiment is also compatible with future digital (Non NTSC) technology, which is not expected to have blanking intervals.

A variation of this T-NET RF uRelay embodiment would employ RF "cordless phones" for voice communications and 2-way uRelays could be installed in the home as well as on streets outside homes to access the CATV cable to provide city-wide coverage (refer to FIG. 9).

SYNERGISTIC MODULATION

Another area of T-NET improvements taught in this specification relates to alternative methods for superimposing non-interfering T-NET data-over-video signals either at video baseband or at an RF carrier or a subcarrier level. Furthermore, the signal "injection" may be a direct wire connection for CATV systems, or over-the-air "mixing" for broadcast systems. In all these cases the superimposed data is made compatible with the television signal upon which it is superimposed to make it invisible to its viewers.

One embodiment of this improved synergistic method transmits a data signal "into the air" at a location downstream from an unrelated but co-channel host TV broadcast transmitter; subsequently a T-NET receiver of that data located either upstream or further downstream synergistically detects the data and host TV signal. The result is that the desired data is communicated more reliably because of the presence of the unrelated TV host signal which appears to "carry" it as a sideband while sharing the same channel, yet the data signal does not cause any perceptible interference to the host TV signal. This T-NET method permits TV broadcasters (wireless or cable) to use their existing over-the-air or cable TV channels to send TV signals as well as data to viewers and also to receive their replies, all co-channel, using their present facilities.

BRIEF DESCRIPTION OF THE DRAWINGS

FIG. 12A is a time waveform illustration of the standard NTSC signal. FIG. 12B is an illustration of how the T-NET data-over-video is superimposed.

FIG. 16 is a table illustrating the distribution of power associated with each of the NTSC waveform components.

DESCRIPTION OF THE PREFERRED EMBODIMENTS

2-Way CATV

This section describes several unique embodiments of the T-NET technology to upgrade existing 1-way cable TV systems for 2-way signal transmission to and from viewers. The T-NET 2-Way CATV approach is a novel departure from present day 2-way cable TV construction plans because T-NET does not transmit viewer responses "uplink" as customarily proposed; it transmits them downlink. In this specification "downlink" means flow in the direction from CATV head-end toward subscribers. Uplink is the reverse direction.

Reverse cable amplifiers are not necessary in T-NET designs, nor is there a need for their related bandpass filters and hybrid uplink/downlink isolation networks. Basically the existing CATV distribution system remains 1-way. The T-NET CATV system sends viewer responses downlink and preferably collects them anywhere after the output of the last cable distribution line amplifier, i.e., at the end of each feeder line. (Generally the responses can be collected at any amplifier in the downlink and not just the last amplifier.) A principal object of this invention is to eliminate the very significant cost and problem of adding CATV reverse amplifiers and collecting, switching, and sorting all (cumulative) viewer responses on the CATV network, together with their cumulative "noise" contribution and sending them "uplink" to the head-end. It will become apparent from the following discussion that this T-NET invention can integrate into future digital TV and "multichannel" compressed video cable systems as well.

Figure 1:
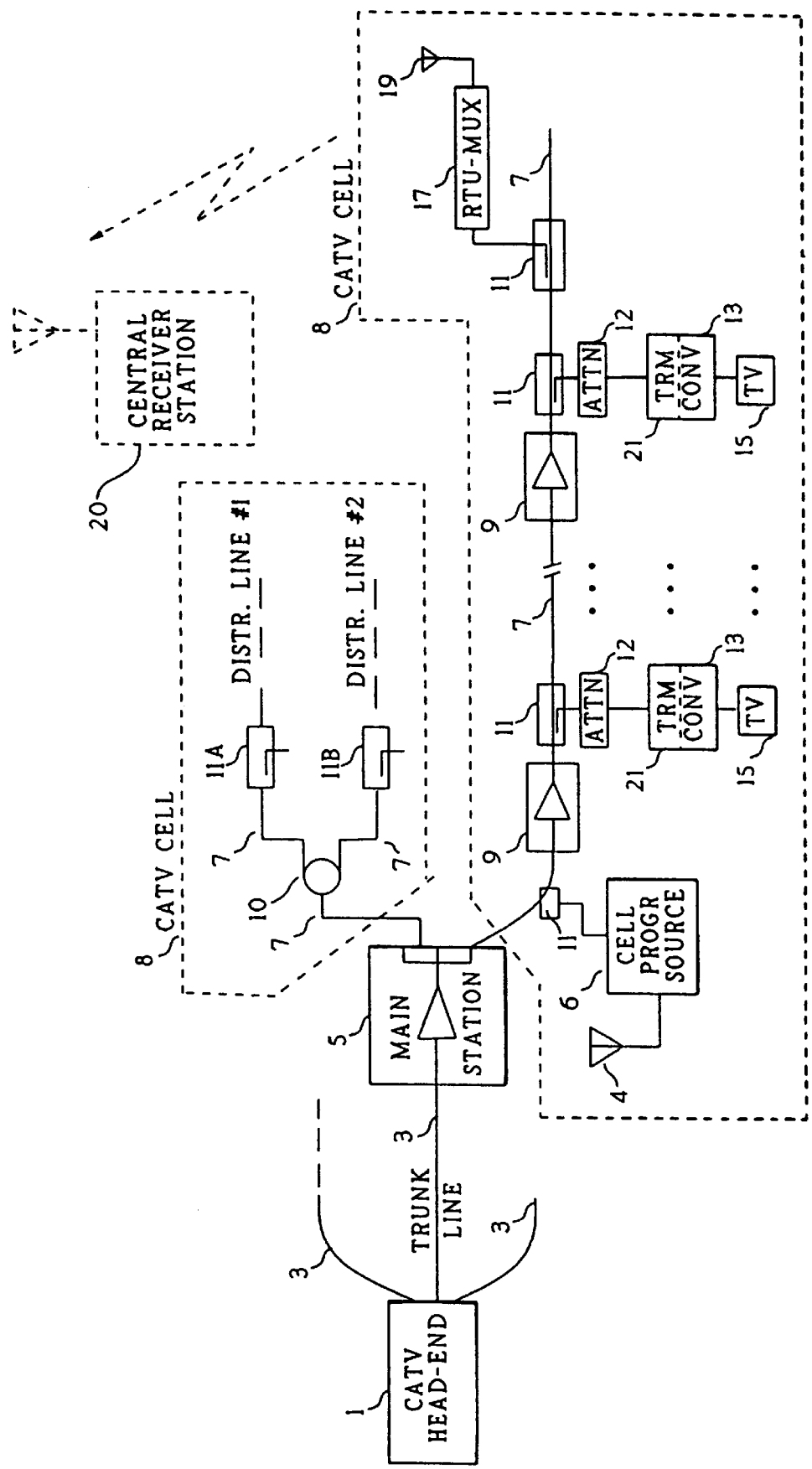
FIG. 1 illustrates the application of T-NET technology to adapt an existing cable TV system for 2-Way interactive TV operation.

FIG. 1 illustrates a typical CATV network wherein head-end 1 delivers TV programs to TV receivers 15 via CATV converter 13. T-NET response module 21 is integrated with circuits of the CATV converter 13 to enable viewer's responses to travel via cable 7 to RTU-MUX 17, thence by radio (or other means) to central station 20. Specifically, head-end system 1 distributes television programs through broadband coaxial or fibre-optic trunk lines 3 to main stations 5 where they are amplified and branched out through a multiplicity of separate distribution coaxial feeder cables 7; each feeder 7 and related assemblies is herein called a "CATV cell" 8. An optional T-NET "cell" program source 6 may be connected to lines 7 to inject special ITV or video-on-demand programming downstream of head-end 1 for viewing by TV receivers 15 which lie only within cell 8. Programming for source 6 may be sent from station 20 by wireless channels via antenna 4, or by other means, such as a separate fibre-optic trunk cable 3 directly from head-end 1.

The length of feeder cables 7 in each cell 8 may be anywhere from a few tenths of a mile to several miles long and may include line amplifiers 9 at intermediate points so as to maintain the signal amplitude of all TV channels within a prescribed system operating level These amplifiers 9 include equalizing networks to compensate for the fact that TV channels at the high end of the spectrum may be attenuated as much as six times the attenuation of low frequency channels. The attenuation in cable 7 between amplifiers depends on its length and is typically held to under 30 dB. Taps 11 (couplers) are installed along the distribution cable 7 near each home to pull-off the television signals and feed them to the TV set-top converter 13 inside each home. These taps include selectable signal attenuator 12, where the amount of attenuation installed is inversely related to the subscriber distance from the last line amplifier 9. The taps 11 also include a directional coupler, discussed in a subsequent paragraph. This tap attenuation typically ranges from 5 dB to 25 dB. The desired TV signal level delivered to each TV receiver is held uniform and typically is in the range of −40 dBm.

The T-NET/CATV response module (TRM) 21 can be built into 2-way converter 13 during manufacture. The response module 21 is relatively simple as illustrated in detail in FIG. 2. Output RF (radio frequency) transmitter 23 injects viewer's response signals into CATV cable 7 in specified time slots and is very low in RF power. This injected RF carrier signal passes through an adjustable attenuator 25. The amount of attenuation is selected at time of installation and is inversely related to the attenuation of the line coupling attenuator 12 for each subscriber as discussed above, through which it must pass in reverse. This results in a relatively uniform T-NET signal injection level for all response transmissions traveling along cable distribution line 7. All these T-NET RF response signals travel "downlink" and their carrier frequency lies within one or several channels of the ensemble of TV programs, preferably in their VBI or HBI. The responses may be either superimposed co-channel with a TV program, or on a dedicated channel or time slot as may be required in future digital CATV delivery systems. For example, the T-NET RF repeater alternative (FIG. 8) described later preferably uses its own dedicated downlink cable channel and uses CDMA (code division multiple access) modulation.

Figure 2:
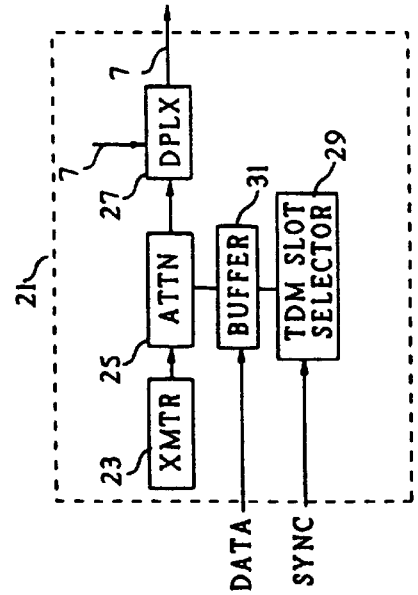
FIG. 2 is a detailed block diagram of the T-NET response module FIRM) shown in FIG. 1.

In the case of fiber optic CATV systems, referring to FIG. 2, an equivalent electro-optic transducer assembly would be substituted for transmitter 23, attenuator 25 and diplexer 27.

Note in FIG. 1 the important advantage offered by this technology because each CATV distribution cable effectively forms a unique "CATV cell" 8. Because in most systems today the CATV cable operates 1-way, it is isolated from other cable "CATV cells" by 1-way amplifiers, thus permitting re-use of response channels in each cell in a manner analogous to cellular radio telephone. For this reason the inventor calls this "cellular cable".

Note a further interesting and important point relating to the 2-Way CATV system shown in FIG. 1. According to the present invention, an injected T-NET response signal can couple from one branch of distribution line 7 into another branch when both of these feeder lines are coupled through a line splitter 10. Specifically, referring to the top center area of FIG. 1, assume an RTU-MUX is placed at the end of distribution line #1. In such a case if a T-NET signal is injected into line coupling tap 11B it will propagate to the left much easier than it will propagate to the right because that is the natural path that television signals are designed to travel. This is because coupling tap 11B usually incorporate a "directional coupler" which permits signals to travel from left to right along line 7 (FIG. 1) and into each subscriber home, but inhibit the signals traveling from the subscriber's home and into distribution line 7 in a direction to the right.

Consequently T-NET signals injected into coupling device 11B travel rather easily to the left, but then encounter line splitter 10 where they are inhibited (attenuated) from jumping across to the other co-axial line 7 and thence to the RTU-MUX. For example, the line-to-line coupling attenuation due to line splitter 10 which a signal along distribution # encounters in propagating into distribution line #1 could be on the order of 35 dB. Nevertheless, this 35 dB attenuation does not deteriorate the signals transmission from line #2 through splitter 10 and into line #1 and on to the end of distribution line 1, thence on to the RTU-MUX where they are collected. In fact the amount of attenuation a T-NET signal encounters going from line #2 through line splitter 10 and into line #1 is not substantially greater than the directional coupler attenuation T-NET signals encounter when directly injected into coupling device 11A for travel in the right hand direction along distribution line #1 to the RTU-MUX. As a consequence of this, only one RTU-MUX is necessary to collect the signals from both distribution line #1 and distribution line #2. Another way of saying this is that distribution line #1 and distribution line #2 together comprise one "CATV cell".

Most cable systems installed today are designed for isolation of future uplink signals (i.e., viewer responses) from the downlink TV programs in the frequency domain through use of RF filters at amplifiers 5 and 9. For example, all cable frequencies below approximately 50 MHz are planned to be used in the future for viewer uplink responses, while all frequencies above 50 MHz are used today for downlink TV program transmissions. As noted above, it is technically difficult to aggregate and transmit thousands of uplink subscriber response signals because each viewer also injects a finite amount of noise into cable 7 and this accumulates, and because RF broadband noise leakage into cable 7 acts like pick-up from many miniature antennas and can accumulate a considerable amount of broadband exterior radio interference (RFI) noise unless extraordinary care is taken. Coordination of thousands of uplink signals is also very complex.

The T-NET technology avoids aforesaid problems by not sending viewer response signals uplink on the cable to begin with, and by specifying individual very low duty cycle time slots within TV blanking intervals (HBI and VBI) in which each subscriber may transmit signals as taught in the inventor's U.S. Pat. No. 4,750,036. What little noise is injected into the CATV cable by each viewer is non-overlapping in time and is constrained to H or V blanking intervals only, thus it is never accumulated or seen on TV screens. Furthermore, only data signals preceding down a specific CATV cell 8 are collected at the output line section of the last cable amplifier. Typically only a few dozen to a few hundred subscribers will employ any one coax feeder line cell 8. This makes more bandwidth available per subscriber, minimizes cumulative noise, and simplifies subscriber transmission coordination (traffic management) problems.

While the T-NET system could transmit in the low cable frequencies set aside in today's CATV systems for future uplink response channels, it was noted above that those low frequencies would require installation of special filters and reverse amplifiers and hybrid isolation networks to separate the uplink signals from the downlink signals in the frequency domain. Since most cable systems do not presently have these components installed, this is not a practical or economic approach compared to the simple T-NET alternative taught here. On the other hand all cable systems today have the proper filters and amplifiers to transmit TV programs downlink to viewers. The T-NET embodiment of FIG. 1 transmits within any one, or several, of the cable TV channels carrying TV programs, but in their blanking intervals, consequently sharing existing TV channels.

Yet another T-NET viewer response alternative described later in this specification transmits during the video portion of the TV signal rather than in blanking intervals, but using the non-interfering T-NET data-over-video method. Obviously the T-NET system could also employ a vacant downlink TV channel.

Referring again to the viewer response module 21 (FIG. 2) which is integrated into converter 13, it is typically a very low power RF device and includes a digital buffer storage 31, TDM slot selector 29, RF oscillator/transmitter 23, attenuator 25 and diplexer isolator 27. Alternatively, an electrooptical coupler assembly may be substituted for those last three components for application in fiber optic CATV systems. Required input to the module from existing converter 13 circuits include the viewer response digital message to be communicated and horizontal and vertical (H&V) sync signals for the TV channel within which viewer responses are superimposed.

For existing CATV systems the simplest and lowest cost T-NET approach is to transmit viewer responses in the H and/or V blanking intervals of the same cable channel assigned to deliver interactive TV (called ITV) programming to the viewer. However, if that ITV channel blanking interval time is already allocated for other ITV purposes such as downlink VBI data transmission to viewers, then T-NET could alternatively transmit responses in the HBI, or by sharing some other regular TV channel, denoted channel "N", yet still employ the readily available synchronizing signals from the ITV channel being received by converter 13, providing the ITV program is synchronized at the head-end to that same regular TV channel "N" as described below.

The T-NET response module 21 preferably uses low frequency TV channels, such as TV Channel 2, which is at 54–60 MHz, because it then encounters minimal attenuation traveling down cable 7 and because the T-NET transmitter circuit can be fabricated very inexpensively at these low frequencies. In such a case if the interactive TV channel is, for example, Channel 50, then at the head end the Channel 50 sync signal generator should be synchronized to the Channel 2 transmitter sync signal so the interactive Channel 50 and Channel 2 are both synchronized to each other. The converter 13 receiver circuits, though tuned to Channel 50, can then provide the necessary synchronization and reference signals for a low cost simple T-NET response module 21 which is transmitting ITV responses on Channel 2. Alternatively, response module 21 could incorporate its own separate receiver to detect co-channel TV signals and thereby obtain the sync signals necessary for TRM transmission in selected TV blanking intervals of any TV channel assigned for communicating co-channel viewer responses. That stand-alone alternative, called a stand-alone retrofit module, is described in the next section and in FIGS. 8A through 8D.

Figure 3:
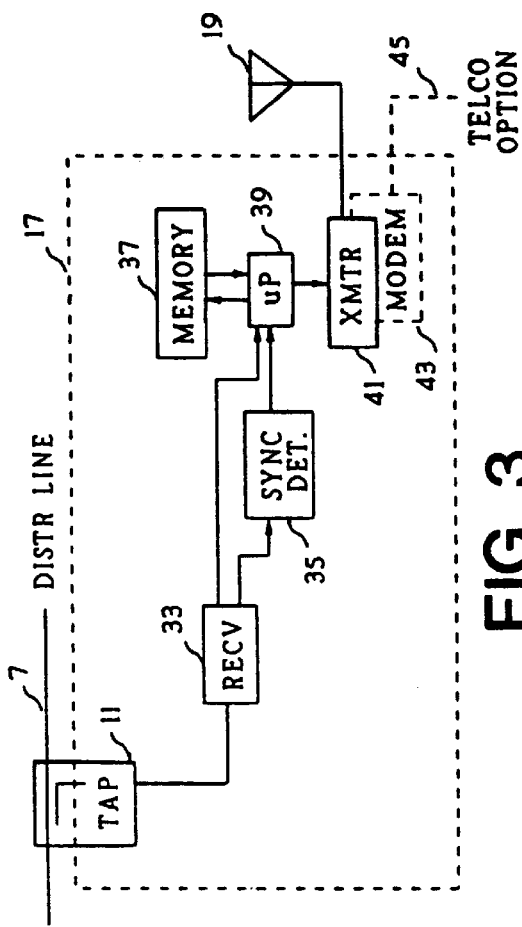
FIG. 3 provides a detailed block diagram of the RTU-MUX illustrated in FIG. 1.

The T-NET device that collects all viewer responses and attaches to the last section of each cable distribution line CATV cell 8 is called an RTU-MUX (multiplexed receiver-transmitter). It is illustrated in FIG. 3. For example, if Channel 2 is selected to carry viewer response signals, then the RTU-MUX receiver 33 would be tuned to Channel 2. This receiver is coupled anywhere after the last amplifier in a CATV distribution line 7 of each cell 8 using a tap coupler 11 essentially identical to the tap used for coupling TV programs to subscribers. Alternatively, coupler 11 frequently is a multiple tap device and any vacant tap could be used for the RTU-MUX.

An arrangement could be made to install the RTU-MUX 17 (FIG. 1) in a subscriber's home or at another location (e.g., a convenience store or gasoline station) so that the RF output of transmitter 41 can be transmitted by antenna 19 to a central location 20 using the local T-NET wireless system described in the inventor's U.S. Pat. No. 4,750,036, or alternatively, a telco modem 43 could be connected to a dedicated phone line 45 to transmit viewer responses back to the central location. Alternatively, a microwave uplink could be provided.

CATV Retrofit Response Module

Figure 4:
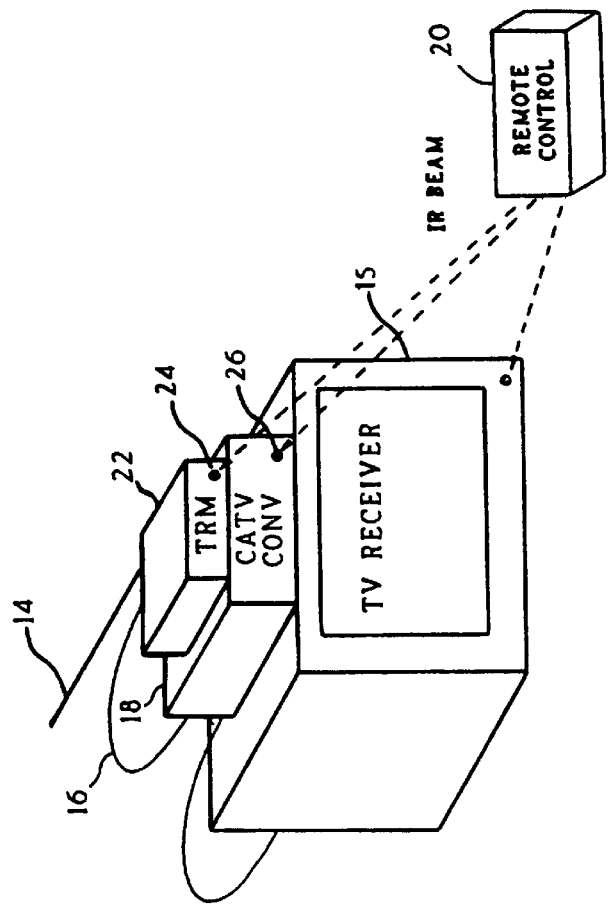
FIG. 4 illustrates how a T-NET retrofit module may be installed in a subscriber's home.
Figure 5:
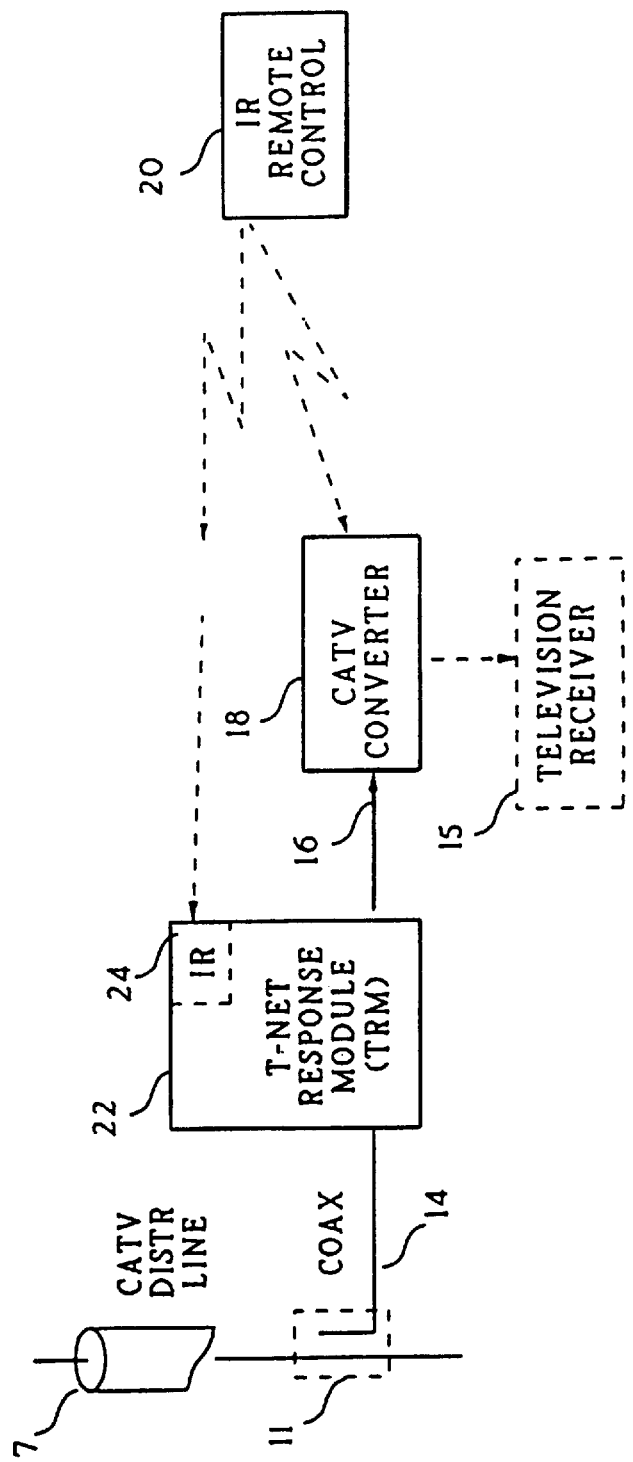
FIG. 5 provides a simplified block diagram of the CATV 2-Way retrofit module.

At the present time there are about 50 million cable TV subscribers in the United States serving about 60% of the population and most have a 1-way CATV converter box. Consequently it is highly desirable to keep most of these converter boxes in operation throughout their useful life. A T-NET retrofit response module (TRM) will permit 2-way transmissions retaining the present CATV converter by simply providing for insertion of the TRM between the cable converter and the co-axial cable output which feeds it, as illustrated in FIG. 4. Normally incoming co-axial cable 14 connects CATV signals to existing cable converter 18, however, for 2-way CATV service a new T-NET stand-alone response module 22 is placed on top (or nearby) existing converter 18. A new co-axial cable 16 connects TRM 22 to converter box 18 to provide both TV and ITV programs. Either an existing "universal" or special IR remote control 20 controls existing converter 18 as well as TRM 22 through IR sensors 26 and 24 and perhaps also the TV receiver. FIG. 5 is an overall block diagram illustrating this retrofit module 22 functional configuration.

Figure 6:
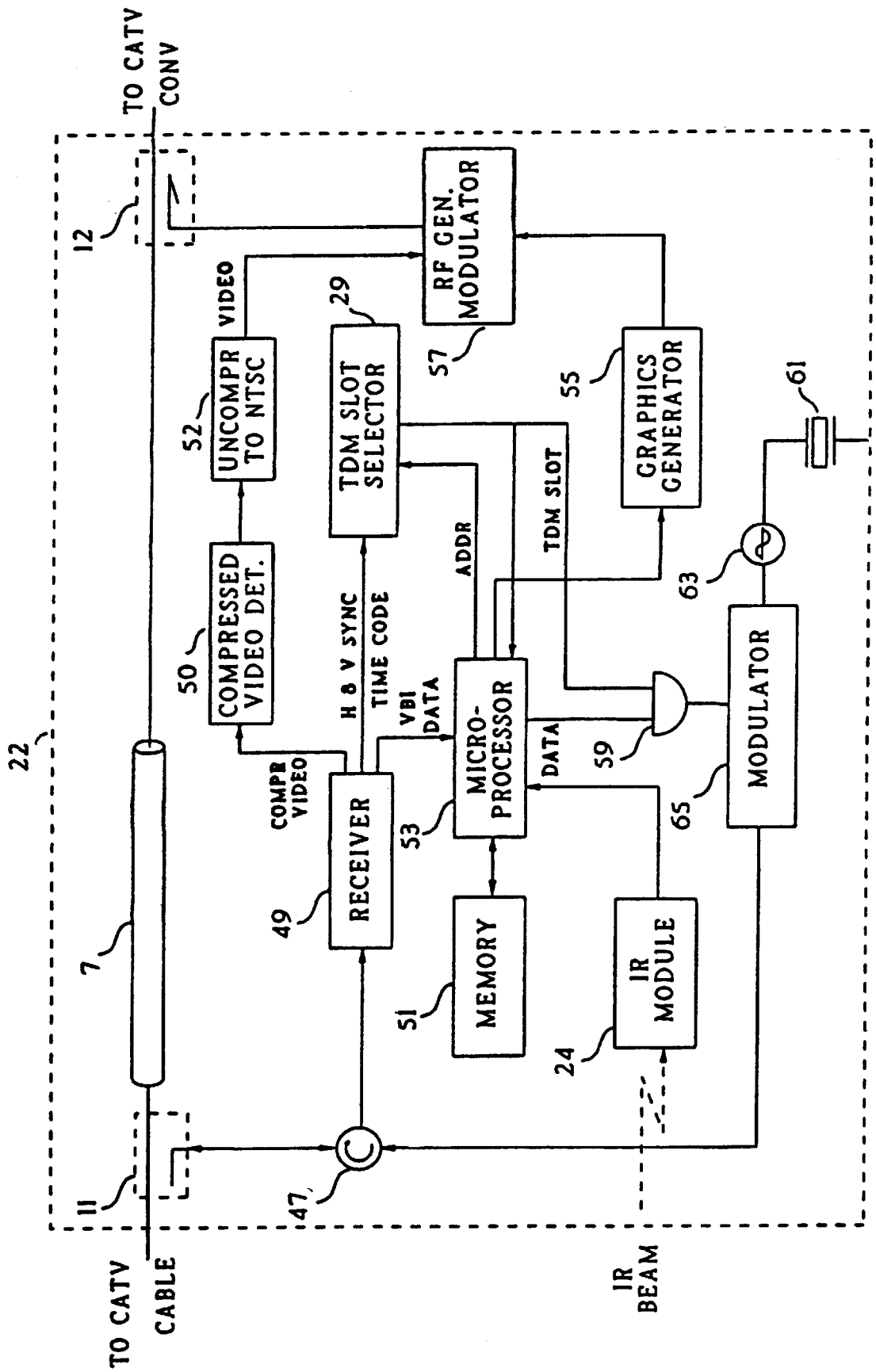
FIG. 6 is a detailed block diagram of the CATV 2-Way retrofit module illustrated in FIG. 5.

T-NET response module (TRM) 22 is shown in greater detail in the block diagram of FIG. 6. The TV channel the TRM is assigned to operate on is picked up by coupler 11 and sent to receiver 49 through an isolator circuit 47. Receiver 49 detects downlink data, compressed (digital) video and synchronizing signals as well as time codes that enable TDM slot selector 29 to uniquely select a pre-assigned time slot in which this particular subscriber is assigned to transmit on. That time slot also corresponds to the address for that particular TRM and uniquely identifies the subscriber. Receiver 49 also detects and outputs downlink data to viewers that may be transmitted, for example, in the VBI of the channel to which receiver 49 is tuned. Receiver 49 can also detect digital data-over-video to provide an additional (optional) "compressed" TV channel which is superimposed on a regular TV channel in the manner described later in this specification.

The downlink VBI data is sent to memory 51 for storage. Memory 51 also stores any programming instructions to operate the microprocessor as well as other control information. Control of module 22 is provided through the viewer's remote control 20 and IR receiver module 24 as commanded by the subscriber. For example, if the subscriber wishes to review a television program listing (which is constantly updated through receiver 49), then this information is retrieved by microprocessor 53 from memory 51 and loaded into graphics generator 55. The graphics generator drives an RF generator/modulator 57 which outputs a composite video RF signal and couples it through unidirectional coupler 12 to TV receiver 15 for display. The subscriber, using the remote control 20, may then, for example, scroll through the TV guide, automatically program his VCR, or do other things with the information so displayed.

A subscriber, using remote control 20, may transmit responses to TV game shows, TV surveys, conduct transactions and the like by pressing the keys of the remote control which then sends an IR beam signal to module 24 thence to microprocessor 53. The microprocessor formats this viewer response and applies it to AND gate 59. At the appropriate time slot as determined by the TDM slot selector 29, a gating signal is applied to the second terminal of AND gate 59 so that the viewer response message is then applied to modulator 65 which in turn transmits that message "downlink" on cable 7 via isolator 47 and coupler 11. Oscillator 63 and crystal 61 generate the RF carrier for that viewer response.

Referring again to FIG. 6, optional circuits 50 and 52 detect and uncompress an optional data-over-video downlink video signal and convert it to NTSC format (or other formats). That NTSC signal is sent to RF generator/modulator 57 where it is put on an RF carrier, typically on TV channel 3, for transmission as NTSC composite video to TV receiver 15 for viewing.

Figure 7:
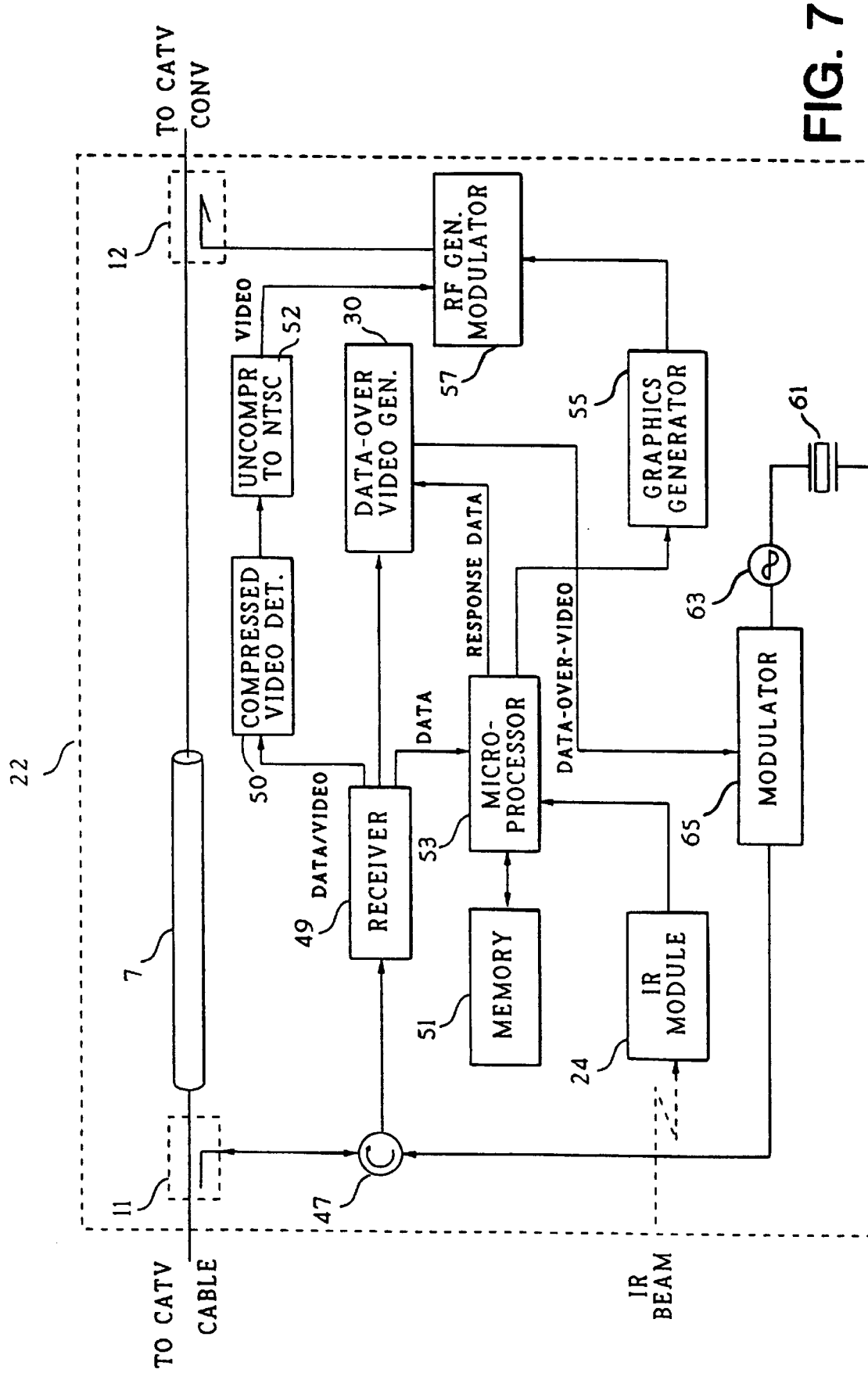
FIG. 7 is an overall block diagram of a data-over-video response module.

FIG. 7 teaches the inventor's data-over-video method of transmitting viewer responses co-channel down the CATV cable as an alternative to the blanking interval (e.g., VBI) data transmission method described above (FIG. 6). In this method the viewer digital response is transmitted during the video portion on one or several pre-assigned TV horizontal scan lines which also carry regular video pictures to the viewer, but in such a manner that the digital data is sent in a first polarity on one TV frame and subsequently it is repeated in the opposite digital polarity on the following frame so that the visual effect of the data cancels and becomes essentially invisible to the viewer of the particular video channel on which this data is superimposed. To accomplish this cancellation, the viewer's response digital data rate must equal an odd harmonic of one-half the standard TV horizontal scan rate, as will be described in a subsequent section of this specification. Suffice it to say at this point that the specific picture elements (pixels) where the data appears "bright" on one TV frame, reverses on a subsequent frame and appear "dark"; thus to the viewer's eye the cumulative data effects cancel.

One way to allocate the data-over-video viewer response CATV cable transmission capacity is to assign perhaps one-half of one TV video horizontal line to a specific subscriber during any given communication session to send, for example, a 128-bit word. The second-half could likewise be assigned to another viewer. Since there are 483 active video lines (the rest of the 525 lines are in the VBI) in each NTSC TV frame, and two frames are needed to transmit the viewer's data word, this would provide capacity for 926 viewer responses for each selected TV channel, for each coaxial cable distribution line cell 8. Since there are 30 TV frames per second, each of 923 subscribers could consequently transmit 1920 bps (net) simultaneously in each cell 8. Obviously more TV channels are available and could be used to increase this capacity. Other allocations for each subscriber could be used to provide capacity to transmit digitized voice signals to and from subscribers.

Alternatively, some of the horizontal video lines could be assigned to carry downlink data to viewers, while other lines could carry uplink data from viewers. For example, a cell program source 6 (FIG. 1) could transmit compressed data-over-video TV programs to modules 22 (FIG. 7) where they would be processed by circuits 50 and 52 and sent to TV receiver 15 for viewing. The technical details of this method are described more fully in a subsequent section. Note that this method is not restricted for use on present day NTSC type television formats only; in the future T-NET technology could also be used with advanced digital television methods.

RF uRelay Module

Figure 8A:
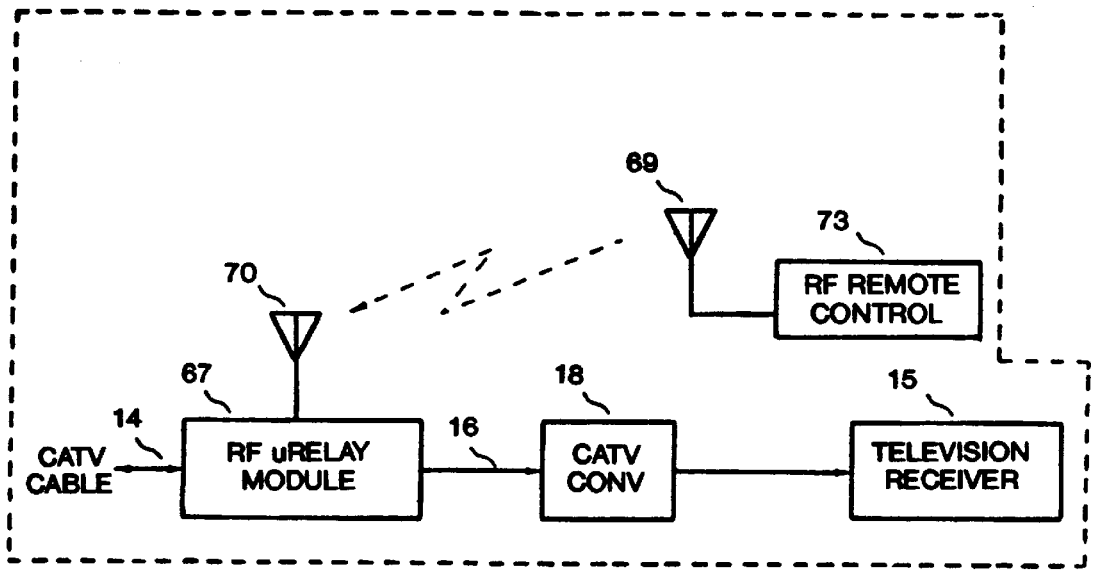
FIGS. 8A–8D present block diagrams of various configurations of the T-NET RF uRelay (microrelay) module and companion RF remote control.

FIGS. 8A through 8D illustrate an RF uRelay (microrelay) module which accomplishes a function comparable to the retrofit response module described in the preceding section. Referring to FIG. 8A, RF uRelay module 67 inserts between the end connector of CATV cable 14 and the existing CATV converter 18, via cable 16, in the manner described earlier. A radio frequency (RF) remote control 73 operated by the TV viewer transmits radio control signals through its antenna 69 to antenna 70 on uRelay module 67.

Figure 8B:
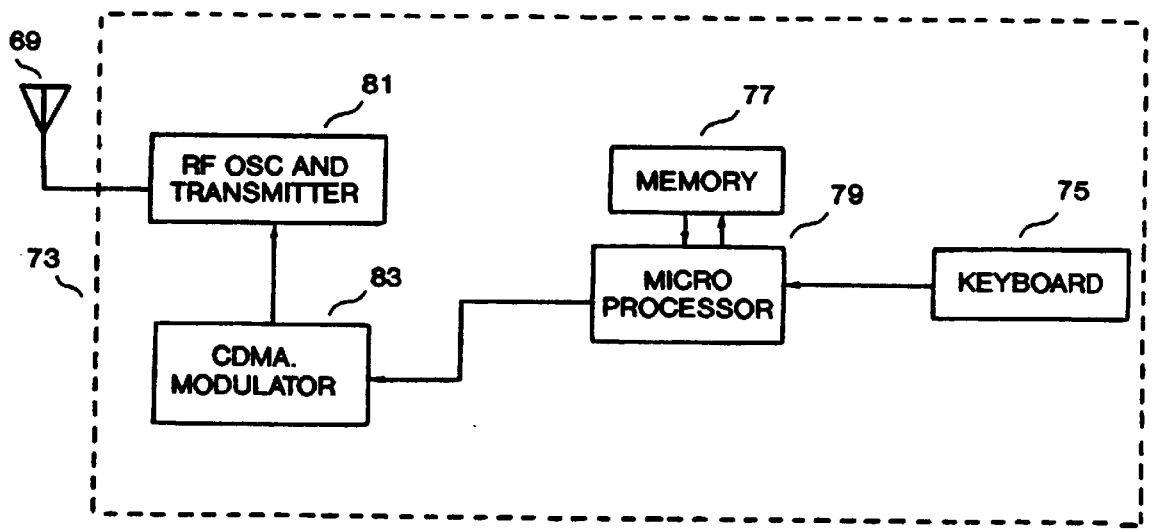

The RF remote control 73 is shown in greater detail in FIG. 8B. A keyboard 75 controlled by the viewer generates commands to microprocessor 79 which operates in conjunction with memory 77. Microprocessor 79 reformats the commands as necessary and applies them to CDMA (code division multiple access) modulator 83. Modulator 83 superimposes these commands on RF oscillator/transmitter 81 where they are transmitted to the RF uRelay module 67 through antenna 69.

Various forms of modulation could be employed in this RF uRelay design but the CDMA method is preferred because it minimizes or eliminates the need for synchronization of viewer response transmissions. It is well known by communications engineers that CDMA transmissions may be superimposed upon each other (within certain well known limits) without any mutual interference and these signals can later be sorted out at the receiving location using the proper demodulation code. CDMA usually employs various forms of spread spectrum modulation.

In the RF uRelay module embodiments shown in FIGS. 8A through 8D it is preferred that a separate exclusive downlink CATV channel be allocated for viewer responses. However, it is obvious from the teachings presented above that the CDMA modulation could alternatively be constrained to blanking intervals of existing CATV television programs and thus viewer responses could be transmitted co-channel with a TV program in a variation of this RF approach. However, future advanced digital television systems are not expected to employ blanking intervals like the present day NTSC standard, hence a separate response channel is preferred for these future systems.

The CDMA mutual interference between simultaneously responding viewers is further minimized by virtue of the fact that each viewer naturally holds a unique physical position along the CATV coaxial cable. Consequently viewers are spread out in time and distance according to their position along the coaxial cable and this aids in preventing exact overlap of viewer responses, hence minimizes CDMA "overload" upon massive viewer responses as might occur when all ITV viewers are asked to respond to a specific question. It is estimated that at least one thousand viewers could respond essentially simultaneously on any one distribution line CATV cell 8 using CDMA. A further advantage of this T-NET CDMA method is that the coaxial cable transmission media is "well behaved" (as compared to wide amplitude propagation variations seen in over-the-air radio transmissions) consequently all response signal levels are kept at a uniform level, eliminating dominant CDMA signals that could mask out weaker CDMA signals.

Figure 8C:
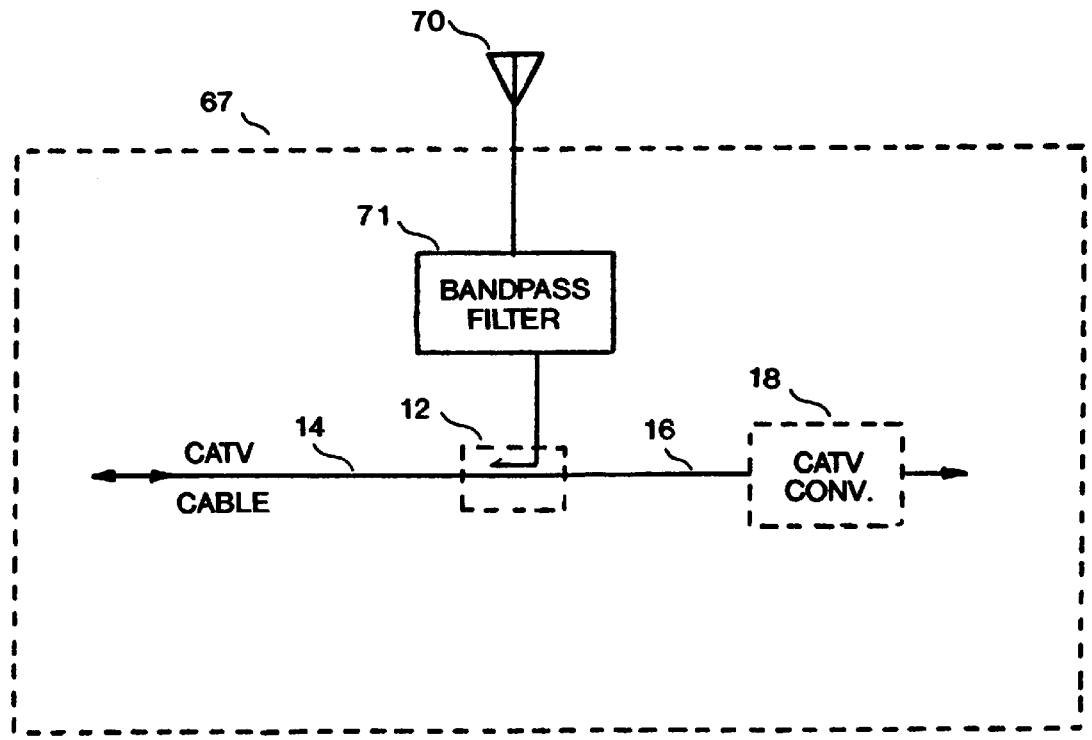

The output of the RF remote control 73 is detected by antenna 70 of the RF passive uRelay as shown in FIG. 8C. That signal is sent through bandpass filter 71 and is connected directly to CATV cable 14 by coupler 12. This is a completely passive low cost method for injecting viewer responses directly into the coaxial cable of the CATV system. The bandpass filter 71 minimizes infiltration of broadband RF noise into coaxial cable 14.

Figure 8D:
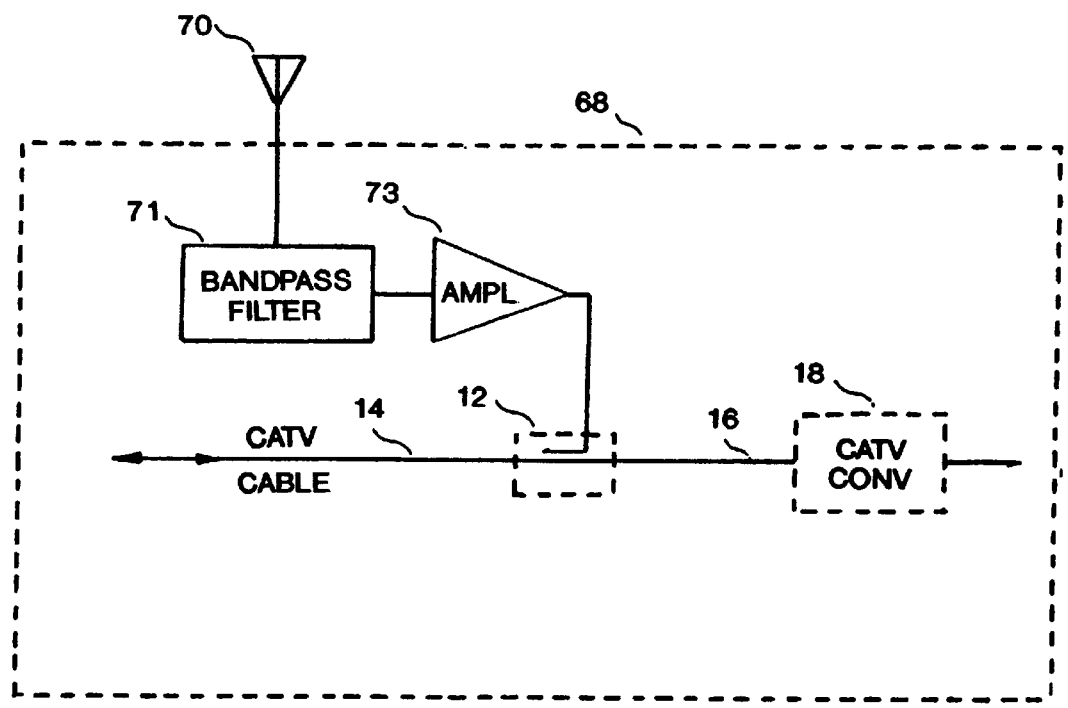

Alternatively, FIG. 8D illustrates an active RF uRelay which functions essentially in the same manner as the passive uRelay described in FIG. 8C. Amplifier 73 is inserted at the output of bandpass filter 71 to increase the power of the response signal before it is injected into cable 14 via coupler 12. In either FIGS. 8C or 8D the coupler 12 can be a uni-directional device to minimize energy leakage toward the CATV converter. This directional coupler is not mandatory, however, since the amount of energy injected into CATV cable 14 is very low level and will not harm CATV converter 18, nor will it interfere with any of the active TV channel video programs.

Figure 9:
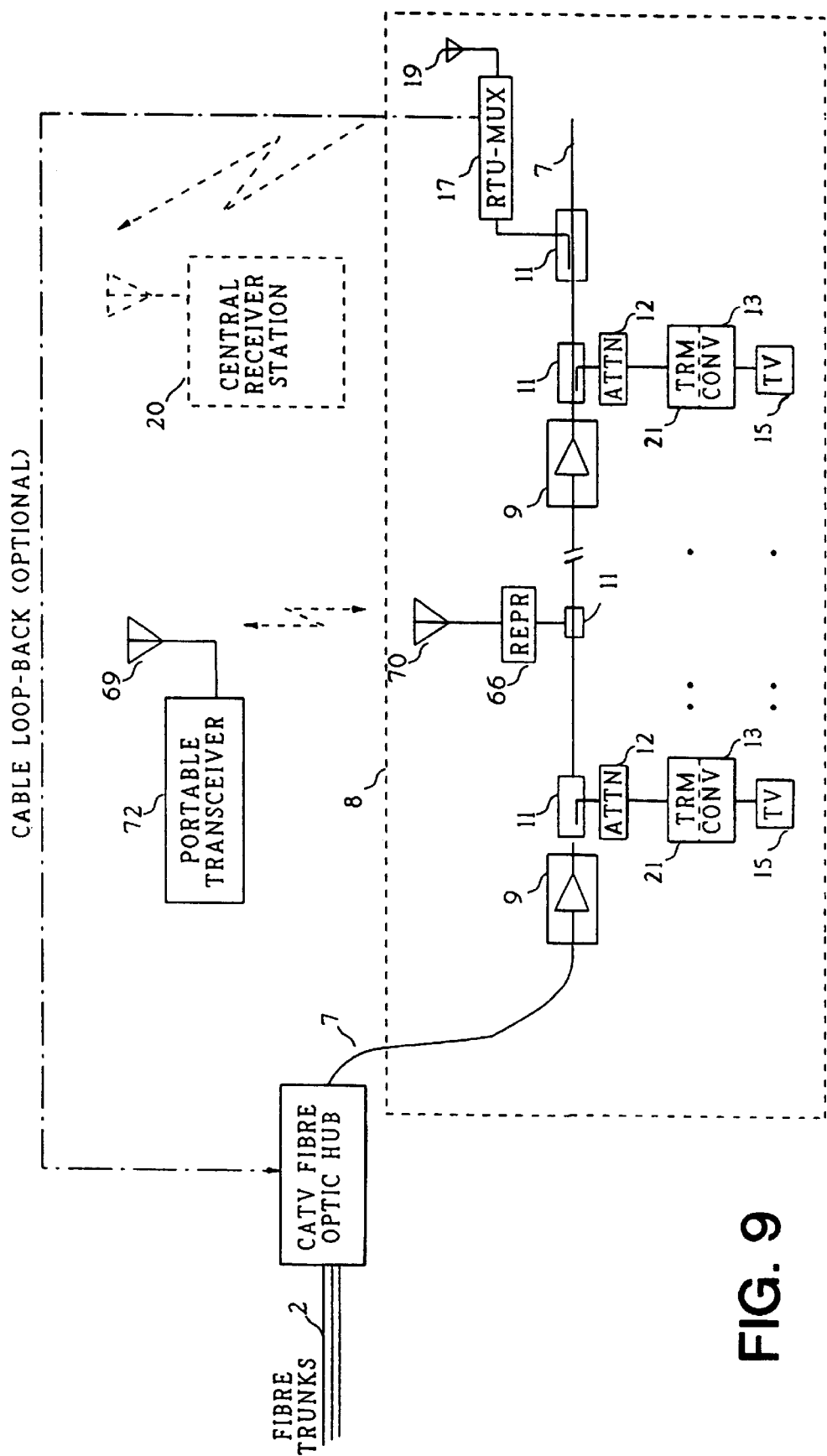
FIG. 9 illustrates an application of the T-NET to adapt existing CATV systems to provide a multimedia cell (e.g., for a cordless phone application).

FIG. 9 illustrates a "multimedia cell" configuration of the T-NET technology wherein an RF (radio frequency) repeater 66 with antenna 70 is positioned so as to detect the radio transmissions from a portable transceiver 72 emitting through its antenna 69 signals such as voice transmissions for so called microcellular or cordless phone applications. The signals injected by 66 into the CATV co-axial transmission line 7 travel along the same path as the ensemble of television signals in the manner previously described and these signals can be detected at a terminating RTU-MUX 17 which is coupled to the co-axial line 7 by the coupling device 11 in the manner previously described. Signals from the RTU-MUX 17 are thence transmitted via antenna 19 to a central receiving station 20. Signals from central station 20 to repeater 66 travel on CATV line 7 with the TV signals as previously described.

DATA-OVER-VIDEO

The T-NET data-over-video process involves the following steps:

1. The superposition of a data signal on a host video signal in a first TV video frame, followed by the superposition of inverse data (data) in a following TV frame. This two-frame data superposition results in apparent video cancellation of the data signal on the TV screen, in so far as the human eye is concerned.

2. The data superposition referred to above may be injected at the originating host signal source, or at a time or location other than the place and time of origination of the host video signal, and by modulation means applied on the host video baseband signal, or its carrier, or on a subcarrier signal.

3. The subsequent detection and demodulation of the data signal at remote receiver locations is carried out with reference to the host video signal and/or its carrier or subcarrier. The inventor refers to steps 2 and 3 above as synergistic modulation/demodulation (see U.S. Pat. No. 5,177,604 for additional description).

This data-over-video process is analogous to the related modulation and visual canceling effect of the chroma subcarrier signal when superimposed on monochrome video as set forth in the NTSC television standard. However, unlike the case of NTSC chroma modulation, in the T-NET concept the data signal is designed to exactly cancel because it is duplicated and inverted in alternate TV frame pairs. NTSC baseband video is not duplicated and inverted frame-to-frame, nevertheless, because the chroma video modulation is derived from and highly correlated with the monochrome video scenes, the viewer's eye is more "forgiving" of those artifacts. On the other hand the data signal modulation herein proposed is independent of, and although correlated with sync pulses it is not correlated with the host video; consequently more care is required to avoid generating interference and artifacts.

It should be pointed out that from a technical standpoint the inventor's synergistic modulation does not require the knowledge or cooperation of the originator of the host video signal (for example, the TV broadcaster). While there may be administrative issues involved in applying this process (e.g., the FCC's present "must carry" rules), only the technical issues are considered here.

To reiterate, the synergistic data-over-video process taught here may be carried out by superposition of data on host video at (1) baseband level or (2) subcarrier level or (3) RF level. The baseband and subcarrier injection process is more easily understood by communication engineers, however, the process of data injection at RF level is very novel and is more difficult to comprehend.

Review of NTSC

Figure 10A:
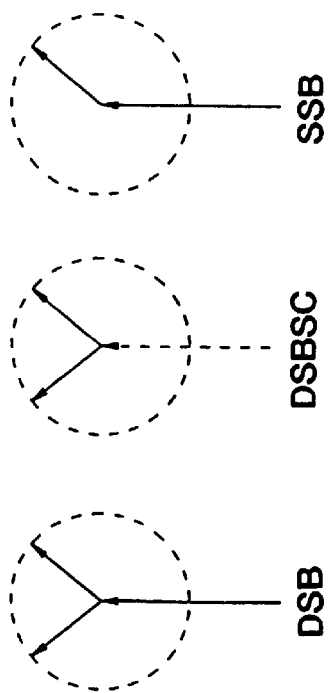
FIGS. 10A and 10B illustrate the modulation and spectrum allocation used by present day NTSC television systems.

It is instructive to review the NTSC television modulation standard in order to provide a background for discussing and understanding the T-NET data-over-video concept. Pertinent aspects of the NTSC color television standard are summarized in FIGS. 10 and 11. The vector diagrams at 10A are a reminder of the three basic modulation processes applied on the TV monochrome (picture) carrier, and color subcarrier. The picture carrier employs a hybrid single sideband (SSB) modulation process because above about 800 KHz it is SSB while below 800 KHz both sidebands are retained (a vestigial lower sideband) and thus in that area it is regular double sideband (DSB) AM. The invention takes advantage of this fact as pointed out in a later section.

Figure 10B:
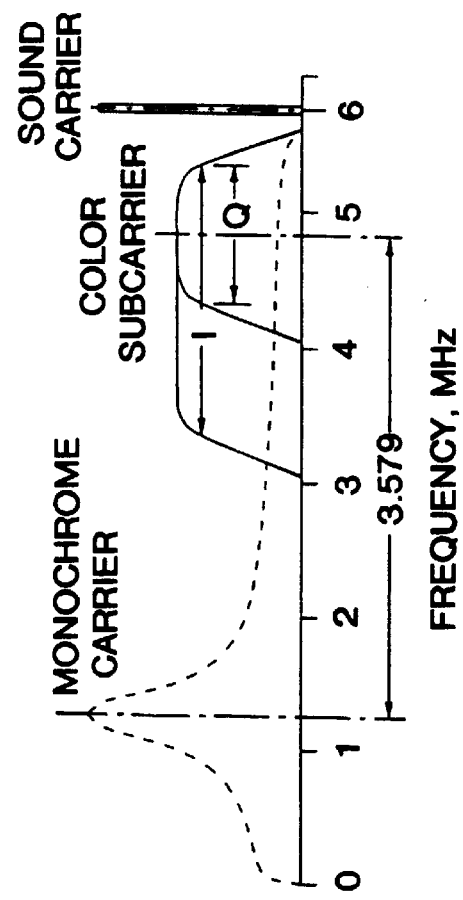

The color subcarrier is a hybrid QAM (quadrature amplitude modulation) process. The in-phase (I) component of the color subcarrier is intended to provide a 1.5 MHz bandwidth even though the upper sideband is truncated above approximately 500 KHz (FIG. 10B), resulting in sideband asymmetry similar to picture carrier modulation described above. On the other hand, the Q component of the color subcarrier retains symmetrically both its sidebands and has a modulated bandwidth of approximately 500 KHz. The chroma subcarrier, shown dotted in FIG. 10A (DSBSC), is suppressed. FIG. 10B shows the NTSC spectrum allocation.

Because the upper sidebands of the "I" component of the modulated chroma subcarrier is truncated above approximately 500 KHz, a compensating filter process at the TV receiver would normally be required, but for economic considerations this is often ignored. In addition, and perhaps in partial compensation for the fact that many receivers do not include ideal processing, the "I" component lower sideband is frequently rolled off below the 1.5 MHz desired bandwidth.

Figure 11:
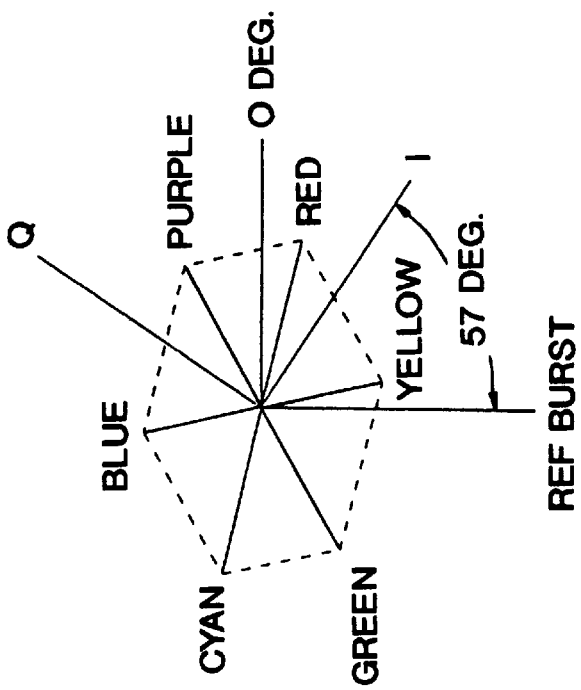
FIG. 11 illustrates how the color subcarrier of NTSC is programmed.

A vector diagram showing the relation of the various colors conveyed by the "I" and "Q" channel components is presented at FIG. 11. It is significant to the following discussion to point out that the NTSC chroma subcarrier transmission/reception process in actual practice delivers a phase angle accuracy (tolerance) on the order of two electrical degrees in its definition of color (hue). This implies a relatively good signal-to-noise (S/N) ratio for most TV signals, on the order of 30 dB or higher for the chroma signal in typical applications.

The top of FIG. 12 illustrates the time domain allocation of the NTSC signal amplitude range, particularly during the horizontal blanking interval (HBI). The 100% modulation range (to peak-of-sync) of the TV transmitting signal is defined by industry practice to equal 160 IRE units.

The useful video amplitude span from white level to black level occupies a modulation range from 12.5% to 70.3%. In IRE units, this corresponds to a 7.5 IRE to 100 IRE video range. Note that the chroma sync burst swings ±20 IRE and is allowed to penetrate during fly-back into the visual range, i.e., its negative sine wave peak excursions swing "gray" to the extent of 12.5 IRE. Nevertheless, the chroma sync burst does not become visible to the human eye in older TV receivers because its phase is inverted 180 degrees on alternate TV frames, partially canceling visual artifacts it might otherwise cause. This chroma sync burst penetration into the visual range, and its resulting visual cancellation, is similar in principle to cancellation in the T-NET concept. Most newer TV receivers provide circuit enhancements that drive the screen more "blank" in the VBI and HBI, eliminating all chroma burst visual effects.

Data Signal Injection

The illustration at the bottom of FIG. 12 shows the basic T-NET data-over-video superposition concept in the time domain. During the standard 53 uSec video pedestal, data is shown superimposed on a video signal under three different cases: data Case A is in the mid-range of the video amplitude, data Case B is at or near the black level, and data Case C is at or near the white level. Here data Case A will be primarily discussed. The data Case B is interesting because the inventor's circuits purposely drive the modulation deeper into the black level so that both data and inverted data stay in the black while in data C cases the data and video modulation is driven into the white level. The reason for this is because for a signal level which is already black but becomes gray due to superimposed data on one frame, it becomes difficult to make it look blacker than black on a second frame. The converse is true in the data Case C.

It is pointed out in a later section of this specification that a superimposed T-NET data modulation amplitude increment/decrement on the order of 5 or 6 IRE on the video waveform appears feasible and provides adequate signal-to-noise (S/N) margins.

Any alien signal superimposed upon an NTSC video waveform pedestal which is intended to invert on every other TV frame so as to visually cancel will, because of this restriction, appear in the frequency domain as a series of spectral lines which lie between (i.e., interleaved) the spectral lines that comprise the video signal itself. The reason for this is that any signal riding on the periodic video pedestal (15,734 Hz) which is intended to visually cancel by alternating its polarity must possess a fundamental frequency which is an odd multiple of one-half the television horizontal scan (H-scan) frequency. The best illustration of this canceling phenomenon is the choice of frequency for the NTSC chroma subcarrier; it too is a odd multiple of one-half the horizontal scan rate, in this case a multiple equal 455.

An NTSC color subcarrier at a multiple of 455 times one-half the H-scan rate results in a frequency of 3.579545 MHz, which is the well known chroma frequency. In the QAM NTSC modulation process the subcarrier is suppressed (DSBSC) but nevertheless the "I" and "Q" sidebands that remain still possess the frame-to-frame alternating polarity required for visual cancellation. This is not an exact cancellation for reasons noted before.

Figure 13:
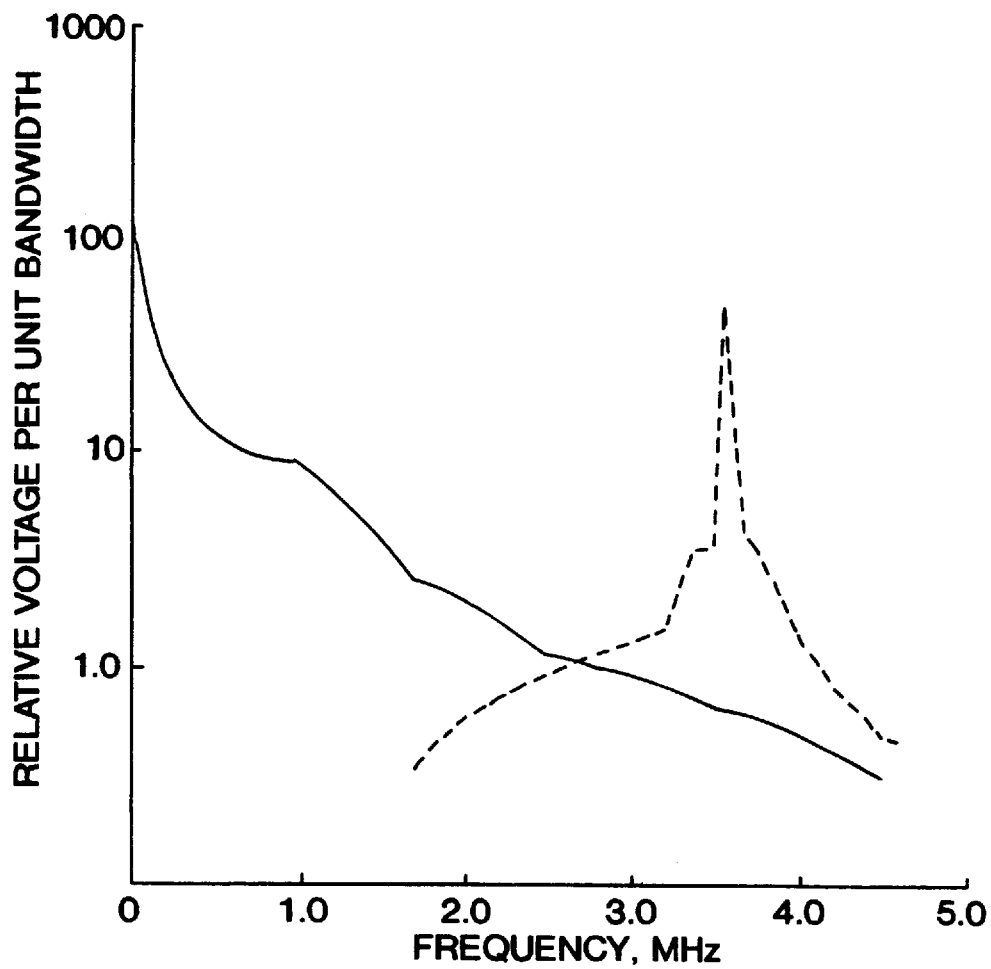
FIG. 13 is a graphic illustration of the power spectrum of an NTSC television video signal.

FIG. 13 illustrates the spectral distribution of a typical well modulated video NTSC test slide known as "Tulip Garden" (ref: Television Engineering Handbook, L. B. Benson, McGraw-Hill 1986, FIGS. 5–24). Note that the chroma signal modulation peak level (shown dotted) is typically more than 20 dB below the peak-of-sync level for the monochrome signal spectrum. FIG. 13 is calibrated in volts per unit bandwidth, this represents 20 dB per horizontal division. Note that the relative power per unit bandwidth is down nearly 60 dB at the cross-over between the monochrome spectrum and the lower sideband chroma spectrum. In this case the cross over is at about 2.7 MHz above the TV carrier. L. B. Benson (op cite) also shows the relation between the power spectrum of the chroma signal and the monochrome signal for the case of a color-bar-chart TV test signal; the cross-over between the chroma and monochrome spectrums is again on the order of 55 dB to 60 dB below the "DC" carrier term of the monochrome signal (i.e., TV peak-of-sync).

From the discussion so far it can be seen that signal isolation between the TV monochrome and chroma signals results from isolation in the frequency domain. In the time domain the monochrome and chroma waveforms are superimposed. In the frequency domain the spectral lines of the chroma signal and monochrome signal are isolated from each other and are interleaved. Note further that in the frequency region where the chroma signal is located the chroma sidebands are from 10 dB to 40 dB above the level of the monochrome spectrum which occupy the same spectrum area, yet do not interfere with monochrome (black and white) TV receivers because of frame-to-frame phase reversal.

Recall that the monochrome signal is amplitude modulated on the television signal carrier and below about 800 KHz it is double sideband. It is pointed out below that at least one new baseband data signal, denoted an "associated information signal," could therefore be arranged to be in quadrature with the AM monochrome signal sidebands, hence isolated from it because of its quadrature (e.g., phase modulation, PM) relation, provided the data sidebands are below 800 KHz, i.e., below 800 KHz the AM-TV and PM-Data would not "cross-talk".

In other words a quadrature modulated (e.g., PM) data signal could be superimposed upon a double sideband amplitude modulated (AM) signal with minimal mutual interference and without the need to provide frequency interleaved spectral lines. On the other hand, PM data signals above about 800 KHz cannot be so isolated because the TV monochrome AM is single sideband there (hence it has "residual" PM) and would consequently conflict with the AM signal. Therefore above about 800 KHz, signal isolation must be provided for by interleaving data signals between the spectral lines of the monochrome signal and this indeed is what the conventional NTSC subcarrier provides.

What the above discussion is leading to is that for "baseband" data modulation below about 800 KHz one could rely on a superimposed quadrature modulated (PM) data signal for isolation, but above 800 KHz one must insert alien signals so they lay between the spectral lines of the monochrome signal. A combination of both methods is also possible. This inventor employs one such combined approach, as discussed in a later section of this specification.

Figure 14A:
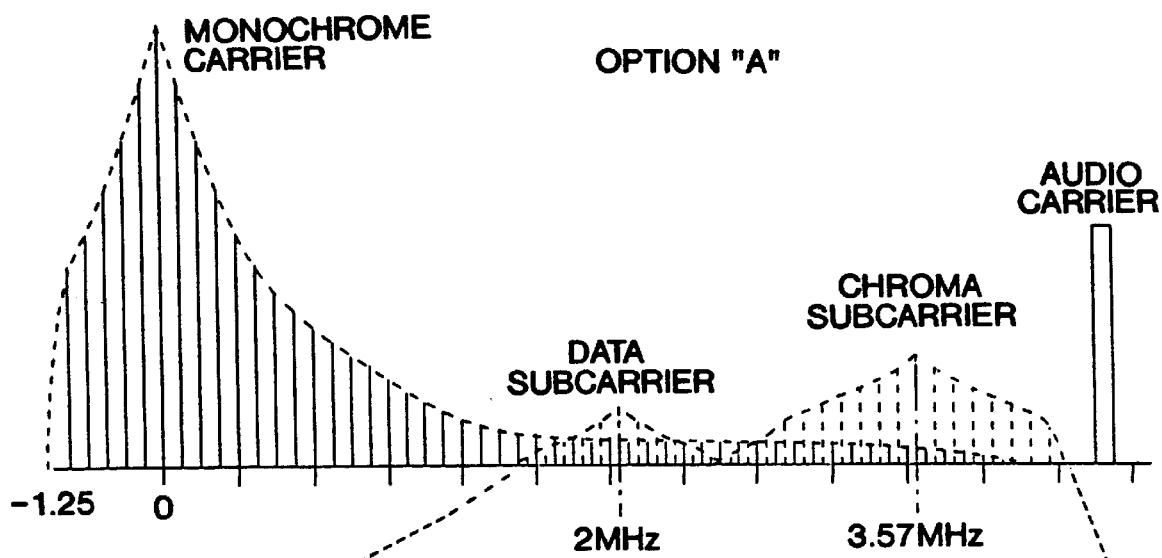
FIG. 14A is a spectral illustration of one T-NET data-over-video modulation method (Option A).
Figure 14B:
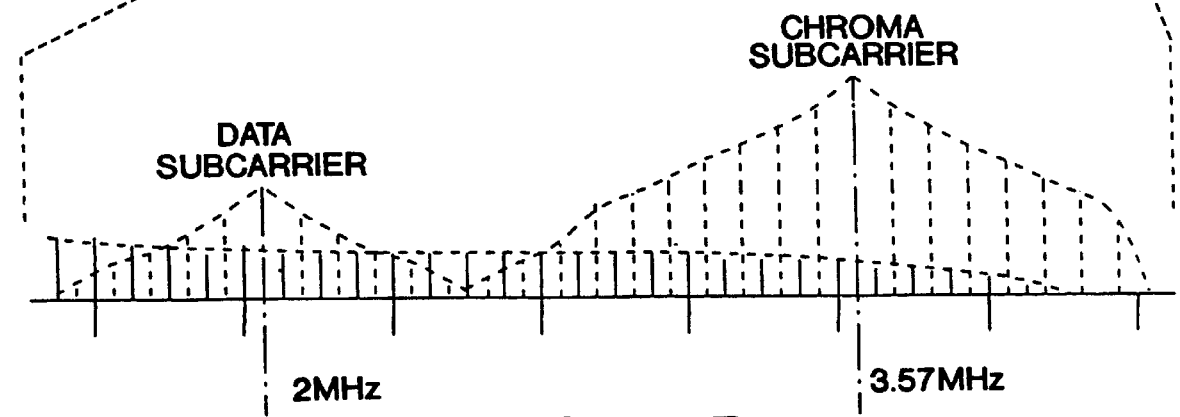
FIG. 14B is a detailed illustration of FIG. 14A.

FIG. 14A illustrates the superposition of a T-NET data signal modulated on an interleaved new subcarrier having a frequency of 2.006118 MHz, for example. This is a frequency 255 times one-half the H-scan rate, consequently providing video cancellation on every other frame. This is called T-NET option A. The subcarrier for option A could also be placed above the chroma subcarrier.

If one employs 8-QAM on option A subcarrier for data modulation, with each of the two 8-QAM orthogonal components operating at a symbol rate of 650 Kspm, yielding 3 bits/symbol, it would provide a net data through-put of 1.5 Mbps; a design goal for future compressed full motion video and sound. The spectral appearance of this superimposed data stream on the NTSC signal is shown in more detail at FIG. 14B. This option A is an example of T-NET data injection at subcarrier level. The result is a composite TV signal with two QAM subcarriers, rather than the usual one (i.e., the chroma subcarrier and data subcarrier). The inventor has found this two subcarrier option to be practical if the data signal injection level is carefully adjusted as discussed in a following section.

Figure 15A:
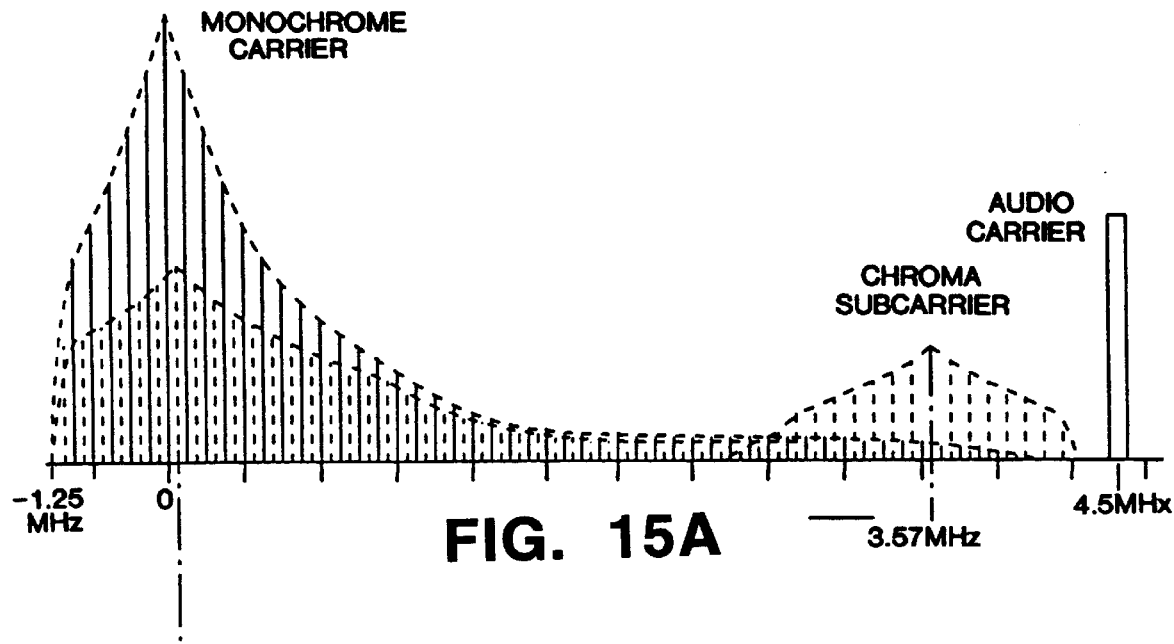
FIG. 15 is a spectral illustration of two alternative data-over-video modulation methods (Options B & C).
Figure 15B:
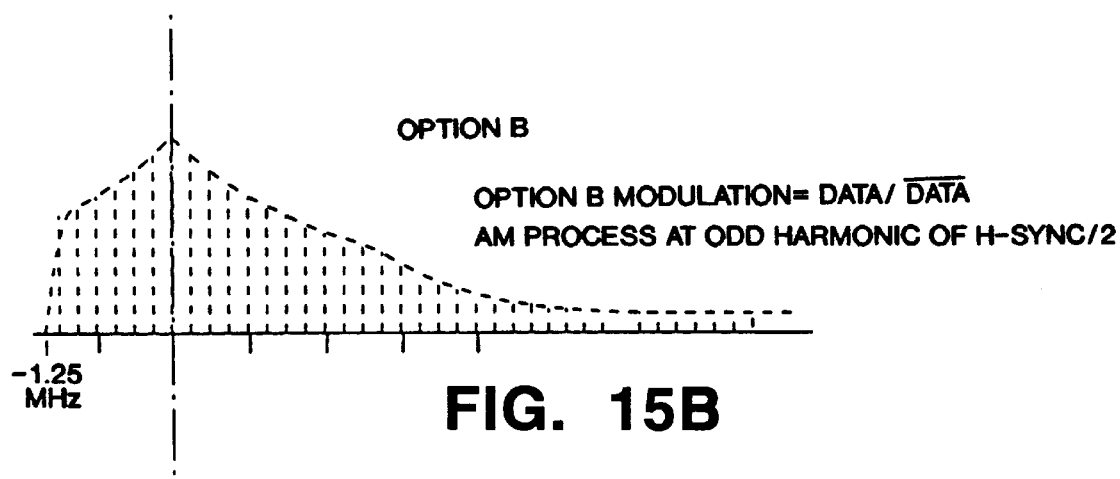
Figure 15C:
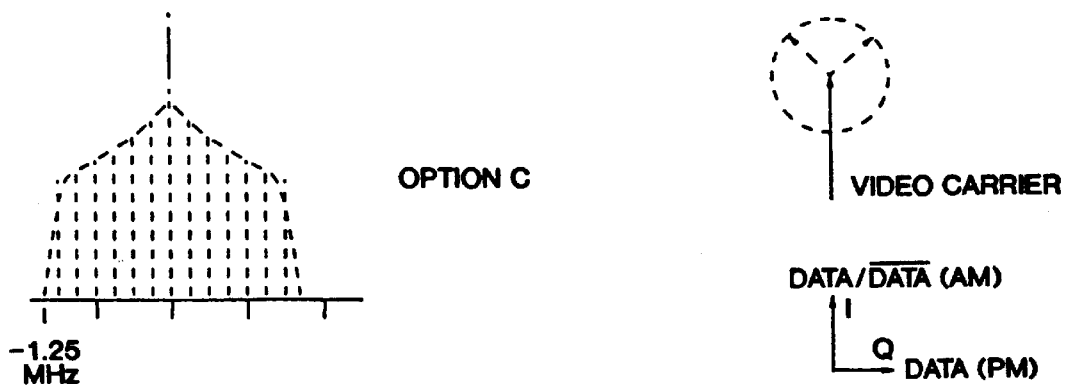

FIG. 15 illustrates two alternative methods (options B and C) of data superposition, but this time at baseband. The baseband signal injection option B process was demonstrated by the inventor at RF level by modulating the data stream (at the required odd harmonic rate) on a separate T-NET RF carrier, independent of and not co-located with the host RF carrier source which was modulated by a regular TV signal. Equivalent baseband superposition was accomplished by subsequently "zero beating" (phase-locking) the T-NET and host TV carriers with the result that the data sidebands became interleaved between the spectral lines of the TV video sidebands in the desired manner described above; i.e., as if the process had occurred at "baseband" at the video source. One advantage of this additive process is that it can be done "downstream" of the TV signal transmitter (e.g., over-the-air or on cable) without the need to coordinate with the host TV broadcaster.

Option C shown in FIG. 15 is illustrated by the vector diagram at the lower right side of FIG. 15. The intention is as follows: the data stream is divided into two components, "I" and "Q". The modulation is at TV signal baseband. The data "I" term is in-phase with the host video RF carrier, consequently its modulation could conflict with the TV video monochrome modulation, however, it is arranged so the "I" data on the TV video will be inverted on alternate frames as already discussed, therefore eliminating undesired video cross-talk effects. The data "Q" component on the other hand is in quadrature with the TV video modulation and under 850 KHz, consequently minimal or negligible cross-talk from the Q data stream will be encountered. The modulation rates used in this process can be on the order of the rates previously discussed in relation to FIG. 14. For example, a data rate of at least 650K symbols per second on each of the two quadrature data components and 3 bits/symbol could be employed, yielding a through-put of 1.5 Mbps or greater. Note that in option C symmetrical sidebands above and below the video carrier can (and must) be provided because the data symbol rate is only 650 Kspm, thus under the TV monochrome AM double sidebands which extend to about 800 KHz.

The preferred data-over-video modulation options shown in FIGS. 14 and 15 may be summarized as follows:

Option A: Add a 2nd data subcarrier below or above NTSC TV host signal chroma subcarrier. Employ 8-QAM (or higher) data modulation for 1.5 Mbps net data rate.

Option B: Modulate AM data stream using QAM onto NTSC host TV carrier at data rate equal odd harmonic of H-sync/2.

Option C: Split data stream into I & Q component and add to NTSC TV baseband signal (or at equivalent RF level). Q term is PM and I term is AM at bit clock equal to odd harmonic of H-sync/2.

Data Signal Power Level Adjustment

This disclosure shall now address the critical issue of determining the optimum amplitude of the superimposed data signal relative to the host TV signal amplitude.

FIG. 16 is a table which estimates the manner in which power is distributed within an NTSC TV signal with a superimposed data signal. Various waveform components of the NTSC TV signal are shown on different lines of this table and their waveform (e.g., pulse width) and related fundamental range in the frequency domain are shown in the first three columns. For example, the video pedestal, which it will be recalled has a minimum amplitude of 12.5% modulation, a pulse width of 53 uSec and a pulse repetition rate of 15,734 Hz. Its fundamental bandwidth is 18.8 KHz around each side of the video carrier frequency. An all white video pedestal of 12.5% amplitude would contain 1.8% peak of sync power, whereas an all black level video pedestal would contain 49.4% of that power.

If digital data pulses are superimposed on this TV video waveform and, for data signal power estimates, each TV pixel width is assumed equal to the width of a data pulse, the amount of power in the T-NET video ± data signal can be determined. This question was already discussed briefly in reference to FIG. 12. At the bottom left of FIG. 12 two data pixels are shown for TV frame N. A corresponding but inverted pair of data pixels would appear at the same location for TV frame N+1. The peak power of these video pixels when it has a digital "1" data pulse superimposed as compared to when it has a "–1" digital pulse subtracted can be estimated. Note (FIG. 12) that in the data "A" case, the Video plus data pixel with a "1" on it would reach approximately 23% relative RF power level, while a Video minus data pixel with a "–1" digital pulse would reach about 17% RF power level. The difference between these two levels being 6%, all relative to peak of sync power.

On the other hand if a similar estimate for the white level of data Case "C" is made, the power increment and decrement caused by data pulses would be significantly less. On the other hand, Black level data (case B) yields much higher data power. Consequently, assuming the data signal amplitude is a fixed IRE value (e.g., ±6 IRE), the power associated with the T-NET data signal depends upon the level of the video upon which it is superimposed. The last the lines in FIG. 16 estimate the relative (re peak-of-sync) power percentage associated with the superimposed data signal for three video signal levels: white level, mid-level, and black level. These data power estimates range from about 1% to 5% of the TV peak of sync power. The inventor has found that on average such data power levels appear 6 to 10 dB below the typical chroma subcarrier signal level when seen on the spectrum analyzer.

The last two columns of FIG. 16 relate these data modulation levels and corresponding signal power to the estimated data signal-to-noise ratio that would result at a T-NET data receiver for a worst case TV signal condition. For terrestrial over-the-air television, this occurs at the TV grade B signal level (lowest commercially usable signal). At the worst case grade B contour a digital data stream modulated at the levels suggested in FIG. 10 (±6 IRE) would result in an estimated minimum S/N of 17.6 dB with data superimposed at the white video levels and rise to a S/N of 25.1 dB when superimposed on video at the black level. This appears to be acceptable S/N for the preferred 8-QAM modulation because this corresponds to equivalent phase noise levels ranging from ±7° to ±3°, not unreasonable compared to the 45° increments of 8-QAM, during worst case conditions. These could be improved in CATV applications where 16-QAM or even 32-QAM could be used for greater data through-put.

While the invention has been particularly shown and described with reference to preferred embodiments thereof, it will be understood by those skilled in the art that various changes in form and details may be made therein without departing from the spirit and scope of the invention.

What is claimed is:

1. In an interactive television system, a method for communicating information to at least one central receiver from at least one remote receiver location, each remote receiver location connected to a cable television system, the cable television system for transmitting at least one video signal over at least one cable, the at least one cable having at least one amplifier along the at least one cable, each amplifier serving at least one remote location, the method comprising the steps of:
   (i) at at least one remote location:
      (a) transmitting the information to be communicated from the at least one remote location onto the at least one cable, the information being transmitted on at least part of the video signal in a first polarity during one video frame of the video signal, and being transmitted on a corresponding part of the video signal in an opposite polarity during a next video frame of the video signal to produce visual cancellation, wherein the information is transmitted at a data rate equal to an odd harmonic of one-half of the horizontal scan rate of the cable video signal.

2. In an interactive television system, a method for communicating information to at least one central receiver from at least one remote receiver location, each remote receiver location connected to a cable television system, the cable television system for transmitting at least one video signal over at least one cable, the at least one cable having at least one amplifier along the at least one cable, each amplifier serving at least one remote location, the method comprising the steps of:
   (i) at at least one remote location:
      (a) transmitting the information to be communicated from the at least one remote location onto the at least one cable, the information being transmitted on at least part of the video signal in a first polarity during one video frame of the video signal, and being transmitted on a corresponding part of the video signal in an opposite polarity during a next video frame of the video signal to produce visual cancellation; and
   (ii) after at least one cable amplifier:
      (a) detecting the information received on the at least one cable and retransmitting the modulated information over the air on a second carrier during at least some of the blanking intervals of a first broadcast channel.

3. In an interactive television system, a method for communicating information to at least one central receiver from at least one remote receiver location, each remote receiver location connected to a cable television system, the cable television system for transmitting at least one video signal over at least one cable, the at least one cable having at least one amplifier alone the at least one cable, each amplifier serving at least one remote location, the method comprising the steps of:
   (i) at at least one remote location:
      (a) transmitting the information to be communicated from the at least one remote location onto the at least one cable, the information being transmitted on at least part of the video signal in a first polarity during one video frame of the video signal, and being transmitted on a corresponding part of the video signal in an opposite polarity during a next video frame of the video signal to produce visual cancellation; and
   (ii) after at least one cable amplifier:
      (a) detecting the modulated information received on the at least one cable and retransmitting the modulated information over the air on a second carrier in a dedicated frequency band.

4. In an interactive television system, a method for communicating information to at least one central receiver from at least one remote receiver location, each remote receiver location connected to a cable television system, the cable television system for transmitting at least one video signal over at least one cable, the at least one cable having at least one amplifier along the at least one cable, each amplifier serving at least one remote location, the method comprising the steps of:
   (i) at at least one remote location:
      (a) transmitting the information to be communicated from the at least one remote location onto the at least one cable, the information being transmitted on at least part of the video signal in a first polarity during one video frame of the video signal, and being transmitted on a corresponding part of the video signal in an opposite polarity during a next video frame of the video signal to produce visual cancellation; and
   (ii) after at least one cable amplifier:
      (a) detecting the modulated information received on the at least one cable and retransmitting the modulated information over a telephone line.

5. In an interactive television system, a method for communicating information to at least one central receiver from at least one remote receiver location, each remote receiver location connected to a cable television system, the cable television system for transmitting at least one video signal over at least one cable, the at least one cable having at least one amplifier alone the at least one cable, each amplifier serving at least one remote location, the method comprising the steps of:
   (i) at at least one remote location:
      (a) transmitting the information to be communicated from the at least one remote location onto the at least one cable, the information being transmitted on at least part of the video signal in a first polarity during one video frame of the video signal, and being transmitted on a corresponding part of the video signal in an opposite polarity during a next video frame of the video signal to produce visual cancellation; and
   (ii) after at least one cable amplifier:
      (a) detecting the information received on the at least one cable and retransmitting the modulated information over the air on a second carrier during at least some of the blanking intervals of a first broadcast channel, wherein the at least one cable amplifier is a last cable amplifier in a downlink direction.

6. In an interactive television system, a method for communicating information to at least one central receiver from at least one remote receiver location, each remote receiver location connected to a cable television system, the cable television system for transmitting at least one video signal over at least one cable, the at least one cable having at least one amplifier along the at least one cable, each amplifier serving at least one remote location, the method comprising the steps of:
   (i) at at least one remote location:
      (a) transmitting the information to be communicated from the at least one remote location onto the at least one cable, the information being transmitted on at least part of the video signal in a first polarity during one video frame of the video signal, and being transmitted on a corresponding part of the video signal in an opposite polarity during a next video frame of the video signal to produce visual cancellation; and (ii) after at least one cable amplifier:
  (a) detecting the modulated information received on the at least one cable and retransmitting the modulated information over the air on a second carrier in a dedicated frequency band wherein the at least one cable amplifier is a last cable amplifier in a downlink direction.

7. In an interactive television system, a method for communicating information to at least one central receiver from at least one remote receiver location, each remote receiver location connected to a cable television system, the cable television system for transmitting at least one video signal over at least one cable, the at least one cable having at least one amplifier along the at least one cable, each amplifier serving at least one remote location, the method comprising the steps of:

(i) at at least one remote location:
  (a) transmitting the information to be communicated from the at least one remote location onto the at least one cable, the information being transmitted on at least part of the video signal in a first polarity during one video frame of the video signal, and being transmitted on a corresponding part of the video signal in an opposite polarity during a next video frame of the video signal to produce visual cancellation; and (ii) after at least one cable amplifier:
  (a) detecting the modulated information received on the at least one cable and retransmitting the modulated information over a telephone line, wherein the at least one cable amplifier is a last cable amplifier in a downlink direction.

8. In an interactive television communication system for transmitting at least one video signal, a method for communicating information from a first transmitter in a downlink direction over at least one cable, to at least one remote receiver location, the at least one cable having at least one amplifier along the at least one cable, each amplifier serving at least one remote location, the method comprising the steps of:

transmitting the information to be communicated in at least part of the video signal in a first polarity during one video frame of the video signal; and transmitting the information on a corresponding part of the video signal in an opposite polarity during a next video frame of the video signal to produce visual cancellation, wherein the information is transmitted in a spectral region different from that including a chroma subcarrier of the at least one video signal, wherein the television communications system includes a television transmitter for transmitting ordinary television programming, and the first transmitter is an auxiliary transmitter separate and distinct from the television transmitter for transmitting ordinary television programming.

9. In an interactive television communication system for transmitting at least one video signal, a method for communicating information from a first transmitter in a downlink direction over at least one cable, to at least one remote receiver location, the at least one cable having at least one amplifier along the at least one cable, each amplifier serving at least one remote location, the method comprising the steps of:

transmitting the information to be communicated in at least part of the video signal in a first polarity during one video frame of the video signal; and transmitting the information on a corresponding part of the video signal in an opposite polarity during a next video frame of the video signal to produce visual cancellation, wherein the information is transmitted in a spectral region different from that including a chroma subcarrier of the at least one video signal, and wherein the information is transmitted at a data rate equal to an odd harmonic of one-half of the horizontal scan rate of the at least one video signal.

10. In an interactive television communication system for transmitting at least one video signal, a method for communicating information from a first transmitter in a downlink direction over at least one cable, to at least one remote receiver location, the at least one cable having at least one amplifier along the at least one cable, each amplifier serving at least one remote location, the method comprising the steps of:

transmitting the information to be communicated in at least part of the video signal in a first polarity during one video frame of the video signal;

transmitting the information on a corresponding part of the video signal in an opposite polarity during a next video frame of the video signal to produce visual cancellation, wherein the information is transmitted in a spectral region different from that including a chroma subcarrier of the at least one video signal;

wherein the transmitting steps each further comprise the step of modulating the information onto a first carrier in the frequency band of a television channel, wherein the first carrier is a video carrier of the at least one video signal in the frequency band of the television channel; and wherein the modulation is quadrature amplitude modulation, and the modulating step comprises the steps of:

amplitude modulating the information to be communicated onto the in-phase component of the video carrier; and phase modulating an associated information signal onto the quadrature component of the video carrier, whereby the associated information signal need not change polarity from frame to frame.

11. In an interactive cable television system for transmitting at least one video signal over at least one cable, a response module for communicating information from at least one remote location along the at least one cable, the at least one cable having at least one amplifier along the at least one cable, the module comprising:

a transmitter for transmitting the information from the at least one remote location onto the at least one cable, the information being transmitted on at least part of the video signal in a first polarity during one video frame of the video signal, and being transmitted on a corresponding part of the video signal in an opposite polarity during a next video frame of the video signal to produce visual cancellation, wherein the information is transmitted at a data rate equal to an odd harmonic of one-half of the horizontal scan rate of the cable video signal.

12. An interactive cable television system for communicating information from at least one remote location along at least one cable, the system comprising:

at least one amplifier along the at least one cable for amplifying signals communicated along the at least one cable;

a cable head transmitter for transmitting at least one video signal downlink over the at least one cable;

a response module at at least one remote location along the at least one cable, the response module comprising:

a first transmitter for transmitting the information onto the at least one cable, the transmitter including circuitry for transmitting the information onto at least part of the at least one video signal in a first polarity during one video frame of the video signal, and for transmitting the information onto a corresponding part of the at least one video signal in an opposite polarity during a next video frame of the at least one video signal to produce visual cancellation; and a multiplexed receiver/transmitter, coupled to the at least one cable after at least one amplifier in a downlink direction from the response module, for detecting the information and for retransmitting the information to a central receiver.

13. The system of claim 12, wherein the multiplexed receiver/transmitter is coupled to the at least one cable after a last amplifier in the downlink direction.

14. The system of claim 12, wherein after the at least one amplifier, the at least one cable comprises a cable television cell including a splitter, and a first distribution line and a second distribution line branching from the splitter, the first transmitter includes circuitry for transmitting the information onto the first distribution line, and the receiver/transmitter includes circuitry for detecting the information on the second distribution line and for retransmitting the information from the second distribution line.

15. The system of claim 12, wherein the receiver/transmitter includes circuitry for retransmitting the information on a second carrier over the air during at least some of the blanking intervals of a first broadcast channel.

16. The system of claim 12, wherein the receiver/transmitter includes circuitry for retransmitting the information on a second carrier over the air in a dedicated frequency band.

17. The system of claim 12, wherein the receiver/transmitter includes circuitry for retransmitting the information onto a telephone line.

18. The system of claim 12, wherein the at least one amplifier is unidirectional in the downlink direction.

19. The system of claim 12, wherein the module further comprises a module receiver for receiving the information, the system further comprising a remote transmitter for transmitting a wireless signal conveying the information to the module receiver.

20. The system of claim 19, wherein the remote transmitter transmits the information to the module receiver over an infrared communications link.

21. The system of claim 19, wherein the remote transmitter transmits the information to the module receiver over a radio frequency communications link.

22. The system of claim 21, wherein the remote transmitter further comprises a CDMA modulator for CDMA modulating the information.

23. The system of claim 12, further comprising an auxiliary program source for transmitting at least one auxiliary information signal to at least one remote location in a downlink direction along the cable only during at least some of the blanking intervals of a cable channel.

24. The system of claim 12, further comprising an auxiliary program source for transmitting at least one auxiliary information signal to at least one remote location in a downlink direction along the cable, the program source including circuitry for transmitting the at least one auxiliary information signal onto at least part of the at least one video signal in a first polarity during one video frame of the at least one video signal, and for transmitting the at least one auxiliary information signal onto a corresponding part of the at least one video signal in an opposite polarity during a next video frame of the at least one video signal to produce visual cancellation of the auxiliary information signal, wherein the information is transmitted in a spectral region different from that including a chroma subcarrier of the at least one video signal.

25. The system of claim 12, wherein the information is transmitted at a data rate equal to an odd harmonic of one-half of the horizontal scan rate of the at least one video signal.

26. The system of claim 12, wherein the module further comprises:

a modulator for modulating the information onto a first carrier in the frequency band of a television channel.

27. The system of claim 26, wherein the modulator includes circuitry for reversing the phase of the first carrier from a first phase during one video frame to an opposite phase during the next video frame.

28. The system of claim 26, wherein the modulator comprises:

a QAM modulator for amplitude modulating the information to be communicated onto the in-phase component of the first carrier, and for phase modulating an associated information signal onto the quadrature component of the first carrier.

29. In an interactive television communication system for transmitting at least one video signal, a data-over-video transmitter for communicating information in a downlink direction over at least one cable to at least one remote receiver location, the at least one cable having at least one amplifier alone the at least one cable, each amplifier serving at least one remote location, the transmitter comprising:

circuitry for transmitting the information to be communicated in at least part of the video signal in a first polarity during one video frame of the video signal, and for transmitting the information on a corresponding part of the video signal in an opposite polarity during a next video frame of the video signal to produce visual cancellation, wherein the information is transmitted in a spectral region different from that including a chroma subcarrier of the at least one video signal, and wherein the television communications system includes a television transmitter for transmitting ordinary television programming, and the data-over-video transmitter is an auxiliary transmitter separate and distinct from the television transmitter for transmitting ordinary television programming.

30. In an interactive television communication system for transmitting at least one video signal, a data-over-video transmitter for communicating information in a downlink direction over at least one cable to at least one remote receiver location, the at least one cable having at least one amplifier along the at least one cable, each amplifier serving at least one remote location, the transmitter comprising:

circuitry for transmitting the information to be communicated in at least part of the video signal in a first polarity during one video frame of the video signal, and for transmitting the information on a corresponding part of the video signal in an opposite polarity during a next video frame of the video signal to produce visual cancellation, wherein the information is transmitted in a spectral region different from that including a chroma subcarrier of the at least one video signal, and wherein the information is transmitted at a data rate equal to an odd harmonic of one-half of the horizontal scan rate of the at least one video signal.

31. In an interactive television communication system for transmitting at least one video signal, a data-over-video transmitter for communicating information in a downlink direction over at least one cable to at least one remote receiver location, the at least one cable having at least one amplifier alone the at least one cable, each amplifier serving at least one remote location, the transmitter comprising:

circuitry for transmitting the information to be communicated in at least part of the video signal in a first polarity during one video frame of the video signal, and for transmitting the information on a corresponding part of the video signal in an opposite polarity during a next video frame of the video signal to produce visual cancellation, wherein the information is transmitted in a spectral region different from that including a chroma subcarrier of the at least one video signal, wherein the data-over-video transmitter further comprises a modulator for modulating the information onto a first carrier in the frequency band of a television channel, wherein the first carrier is a video carrier of the at least one video signal in the frequency band of the television channel, and wherein the modulator comprises a QAM modulator for amplitude modulating the information to be communicated onto the in-phase component of the video carrier, and for phase modulating an associated information signal onto the quadrature component of the video carrier, whereby the associated information signal need not change polarity from frame to frame.

32. In an interactive television system, a method for communicating information to at least one central receiver from at least one remote location, the at least one remote location connected to a cable television system, the cable television system for transmitting at least one video signal over at least one cable in a downlink direction, the at least one cable having at least one downlink amplifier along the at least one cable, the at least one downlink amplifier serving at least one remote location, the method comprising the steps of:

(i) at at least one remote location:
(a) transmitting the information to be communicated from the at least one remote location onto the at least one cable in a downlink direction, the information being transmitted on at least part of the video signal using circuits that minimize mutual interference; and (ii) after at least one cable downlink amplifier:
(a) detecting the modulated information received on the at least one cable and retransmitting the modulated information to the central receiver by wireless means.

33. In an interactive television system, a method for communicating information to at least one central receiver from at least one remote location, the at least one remote location connected to a cable television system, the cable television system for transmitting at least one video signal over at least one cable in a downlink direction, the at least one cable having at least one downlink amplifier along the at least one cable, the at least one downlink amplifier serving at least one remote location, the method comprising the steps of:

(i) at at least one remote location:
(a) transmitting the information to be communicated from the at least one remote location onto the at least one cable in a downlink direction, the information being transmitted on at least part of the video signal using circuits that minimize mutual interference; and (ii) after at least one cable downlink amplifier:
(a) detecting the modulated information received on the at least one cable and retransmitting the modulated information over a telephone line to the central receiver.

34. In an interactive television system, a method for communicating information to at least one central receiver from at least one remote location, the at least one remote location connected to a cable television system, the cable television system for transmitting at least one video signal over at least one cable in a downlink direction, the at least one cable having at least one downlink amplifier alone the at least one cable, the at least one downlink amplifier serving at least one remote location, the method comprising the steps of:

(i) at at least one remote location:
(a) transmitting the information to be communicated from the at least one remote location onto the at least one cable in a downlink direction, the information being transmitted on at least part of the video signal using circuits that minimize mutual interference; and (ii) after at least one cable downlink amplifier:
(a) detecting the modulated information received on the at least one cable and retransmitting the modulated information over a cable to the central receiver.

35. The method of claim 32, wherein the at least one cable downlink amplifier is a last cable amplifier in the downlink direction.

36. The method of claim 32, wherein the at least one cable includes at least one directional coupler tap connected to a television receiver and remote location whereby the information to be communicated is transmitted downlink in a direction opposite the normal path of the at least one directional coupler tap to which it is attached.

37. In an interactive television system, a method for communicating information to at least one central receiver from at least one remote location, the at least one remote location connected to a cable television system, the cable television system for transmitting at least one video signal over at least one cable in a downlink direction, the at least one cable having at least one downlink amplifier alone the at least one cable, the at least one downlink amplifier serving at least one remote location, the method comprising the steps of:

(i) at at least one remote location:
(a) transmitting the information to be communicated from the at least one remote location onto the at least one cable in a downlink direction on a dedicated cable frequency; and (ii) after at least one cable downlink amplifier:
(a) detecting the modulated information received on the at least one cable and retransmitting the modulated information to the central receiver by wireless means.

38. In an interactive television system, a method for communicating information to at least one central receiver from at least one remote location, the at least one remote location connected to a cable television system, the cable television system for transmitting at least one video signal over at least one cable in a downlink direction, the at least one cable having at least one downlink amplifier alone the at least one cable, the at least one downlink amplifier serving at least one remote location, the method comprising the steps of:

(i) at at least one remote location:
      (a) transmitting the information to be communicated from the at least one remote location onto the at least one cable in a downlink direction on a dedicated cable frequency; and
   (ii) after at least one cable downlink amplifier:
      (a) detecting the modulated information received on the at least one cable and retransmitting the modulated information over a telephone line to the central receiver.

39. In an interactive television system, a method for communicating information to at least one central receiver from at least one remote location, the at least one remote location connected to a cable television system, the cable television system for transmitting at least one video signal over at least one cable in a downlink direction, the at least one cable having at least one downlink amplifier along the at least one cable, the at least one downlink amplifier serving at least one remote location, the method comprising the steps of:

(i) at at least one remote location:
      (a) transmitting the information to be communicated from the at least one remote location onto the at least one cable in a downlink direction on a dedicated cable frequency; and
   (ii) after at least one cable downlink amplifier:
      (a) detecting the modulated information received on the at least one cable and retransmitting the modulated information over a cable to the central receiver.

40. The method of claim 37, wherein the at least one cable downlink amplifier is a last cable amplifier in the downlink direction.

41. The method of claim 37, wherein the at least one cable includes at least one directional coupler tap connected to a television receiver and remote location whereby the information to be communicated is transmitted downlink in a direction opposite the normal path of the at least one directional coupler tap to which it is attached.

42. The method of claim 37, wherein the information to be communicated is modulated onto a carrier in CDMA format.

43. In a television communication system for transmitting at least one video signal, a method for communicating information from at least one auxiliary transmitter in a downlink direction to at least one remote receiver location, the method comprising the steps of:

(a) transmitting the information to be communicated in at least part of the spectrum of the video signal using circuits that minimize mutual interference,
   (b) wherein the television communications system includes a television transmitter for transmitting ordinary television programming, and the at least one auxiliary transmitter is separate and distinct from the television transmitter.

44. The method of claim 43, wherein the at least one auxiliary transmitter includes a directional antenna to thereby transmit separate and distinct information into at least one angular sector of a service area containing at least one remote receiver.

45. The method of claim 44 wherein a plurality of auxiliary transmitters include a plurality of corresponding directional antennas to transmit separate and distinct information to remote receivers locations in separate and distinct angular sectors of the service area.

46. The method of claim 43, wherein the remote receiver detects both the information from the auxiliary transmitter and the ordinary television signal and demodulates the information as if it was on a subcarrier of the television signal carrier.

47. The method of claim 43, wherein the auxiliary transmitter is located downstream from the television transmitter and radiates the information to be communicated over the air so as to appear as a sideband of the television carrier.

48. The method of claim 43, wherein the remote receiver detects both the information from the auxiliary transmitter and the ordinary television signal and demodulates the information with reference to timing signals embedded in the television signal.

49. The method of claim 43, wherein the remote receiver detects both the information from the auxiliary transmitter and the ordinary television signal and demodulates the information with reference to modulation in the television signal.

50. The method of claim 33, wherein the at least one cable downlink amplifier is a last cable amplifier in the downlink direction.

51. The method of claim 33, wherein the at least one cable includes at least one directional coupler tap connected to a television receiver and remote location whereby the information to be communicated is transmitted downlink in a direction opposite the normal path of the at least one directional coupler tap to which it is attached.

52. The method of claim 34, wherein the at least one cable downlink amplifier is a last cable amplifier in the downlink direction.

53. The method of claim 34, wherein the at least one cable includes at least one directional coupler tap connected to a television receiver and remote location whereby the information to be communicated is transmitted downlink in a direction opposite the normal path of the at least one directional coupler tap to which it is attached.

54. The method of claim 38, wherein the at least one cable downlink amplifier is a last cable amplifier in the downlink direction.

55. The method of claim 38, wherein the at least one cable includes at least one directional coupler tap connected to a television receiver and remote location whereby the information to be communicated is transmitted downlink in a direction opposite the normal path of the at least one directional coupler tap to which it is attached.

56. The method of claim 39, wherein the at least one cable downlink amplifier is a last cable amplifier in the downlink direction.

57. The method of claim 39, wherein the at least one cable includes at least one directional coupler tap connected to a television receiver and remote location whereby the information to be communicated is transmitted downlink in a direction opposite the normal path of the at least one directional coupler tap to which it is attached.

* * * * *

UNITED STATES PATENT AND TRADEMARK OFFICE
CERTIFICATE OF CORRECTION

| | | |
|---|---|---|
| PATENT NO. | : 5,812,184 | |
| APPLICATION NO. | : 08/526841 | |
| DATED | : September 22, 1998 | |
| INVENTOR(S) | : Martinez | |

It is certified that error appears in the above-identified patent and that said Letters Patent is hereby corrected as shown below:

In the Brief Description of the Drawings, Figure 2, please delete "FIRM" and insert -- TRM --.

In Col. 17, Line 55, please delete "alone" and insert -- along --.

In Col. 18, Line 36, please delete "alone" and insert -- along --.

In Col. 22, Line 43, please delete "alone" and insert -- along --.

In Col. 23, Line 18, please delete "alone" and insert -- along --.

In Col. 24, Line 23, please delete "alone" and insert -- along --.

In Col. 24, Line 53, please delete "alone" and insert -- along --.

In Col. 25, Line 5, please delete "alone" and insert -- along --.

Signed and Sealed this

Eighteenth Day of July, 2006

JON W. DUDAS
*Director of the United States Patent and Trademark Office*